(12) United States Patent
Hiromatsu et al.

(10) Patent No.: US 8,782,300 B2
(45) Date of Patent: Jul. 15, 2014

(54) ELECTRONIC APPARATUS

(71) Applicant: Hitachi ULSI Systems Co., Ltd., Kokubunji (JP)

(72) Inventors: Ayumi Hiromatsu, Higashiyamato (JP); Masahiro Katayama, Takasaki (JP); Takanaga Yamazaki, Tama (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 35 days.

(21) Appl. No.: 13/692,506

(22) Filed: Dec. 3, 2012

(65) Prior Publication Data

US 2013/0145084 A1    Jun. 6, 2013

(30) Foreign Application Priority Data

Dec. 6, 2011    (JP) .................................. 2011-266856

(51) Int. Cl.
*G06F 3/00*    (2006.01)
*G06F 13/00*    (2006.01)
*G06F 15/16*    (2006.01)

(52) U.S. Cl.
USPC ........ 710/15; 710/8; 710/10; 710/29; 710/62; 710/104; 709/232; 709/233

(58) Field of Classification Search
None
See application file for complete search history.

(56) References Cited

U.S. PATENT DOCUMENTS

| | | | | |
|---|---|---|---|---|
| 4,972,368 A * | 11/1990 | O'Brien et al. | ................ | 710/67 |
| 5,119,403 A * | 6/1992 | Krishnan | ................ | 375/261 |
| 5,649,122 A * | 7/1997 | Wegner et al. | ................ | 710/105 |
| 6,263,033 B1 * | 7/2001 | Hansen | ................ | 375/370 |
| 6,381,532 B1 * | 4/2002 | Bastian et al. | ................ | 701/114 |
| 2001/0046266 A1 * | 11/2001 | Rakib et al. | ................ | 375/259 |
| 2011/0026572 A1 | 2/2011 | Kitahara | | |
| 2013/0145084 A1 * | 6/2013 | Hiromatsu et al. | ........... | 711/103 |

FOREIGN PATENT DOCUMENTS

JP    11-272571 A    10/1999
JP    2011-35473 A    2/2011

* cited by examiner

*Primary Examiner* — Michael Sun
(74) *Attorney, Agent, or Firm* — Crowell & Moring LLP

(57) ABSTRACT

An electronic apparatus provided with a serial communication circuit achieving a baud rate adjustment with high precision is provided. For example, a bit width of each of a plurality of bits in received serial data is measured by a clock counter, and an average value of the bit width is calculated detecting its maximum value and minimum value. Moreover, for example, a maximum tolerance and a minimum tolerance are calculated as a value substantially 1.5 times the average value and a value substantially 0.5 times the average value, and determination is made as to whether or not the maximum value and the minimum value are within a range between the maximum tolerance and the minimum tolerance. If they are within the range, the corresponding average value is set in a baud rate setting register.

16 Claims, 13 Drawing Sheets

| COMMAND | LOWER 2 bit | FUNCTION |
|---|---|---|
| 8'h55 | 01 | BAUD RATE ADJUSTMENT |
| 8'h65 | 01 | NEXT COMMAND: 8'h55 |
| 8'hEA | 10 | FCON DIRECT READ ACCESS |
| 8'h6A | 10 | FCON DIRECT WRITE ACCESS |
| 8'bxxxxxx00 | 00 | JTAG ACCESS |
| 8'hFF | 11 | RESET |

REFERENCE VALUE : (7+6+7+7+6+7+7+7+6)/9=6.66... ⇒ 7
BAUD RATE : 12.5MHz/7=1.786Mbps

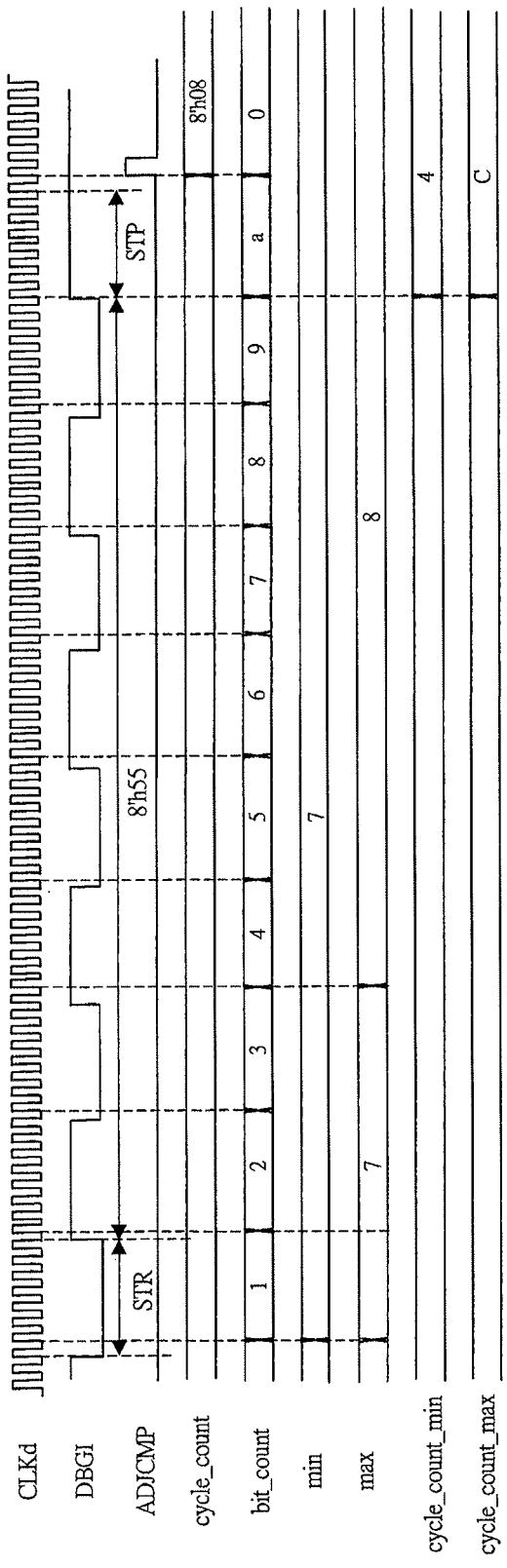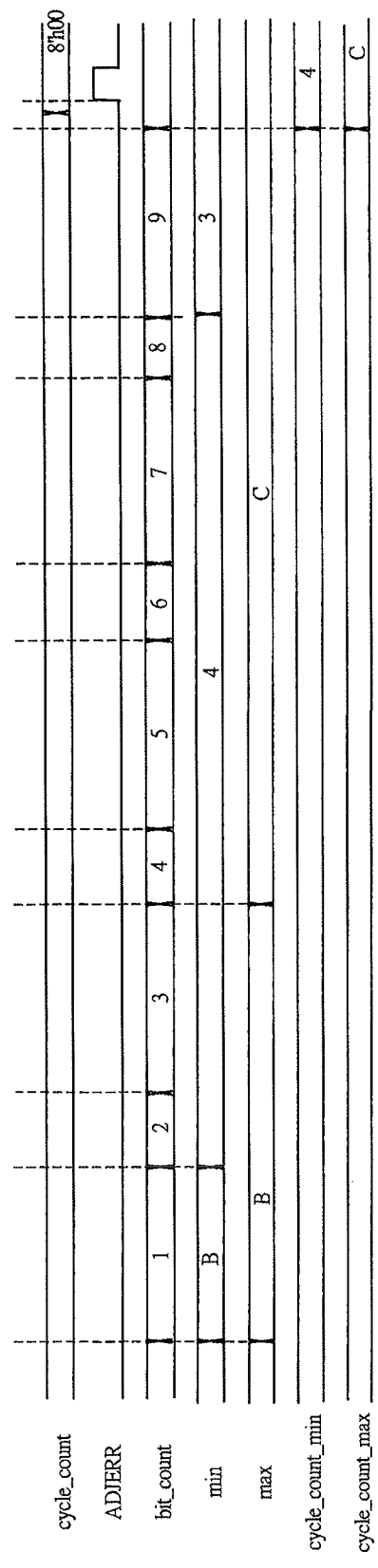
FIG. 8A
FIG. 8B

FIG. 16

| MODULE<br>RESET SOURCE | OCD | WDT | FCON | CPU | PERI |
|---|---|---|---|---|---|
| RST | ○ | ○ | ○ | ○ | ○ |
| POR | ○ | ○ | ○ | ○ | ○ |
| JTAGIF(CPU) | × | × | × | ○ | ○ |
| OCD | × | ○ | ○ | ○ | ○ |

○ : reset
× : not reset

REFERENCE VALUE: (10+20+20+20+20)/9=10

ELECTRONIC APPARATUS

CROSS-REFERENCE TO RELATED APPLICATION

The present application claims priority from Japanese Patent Application No. 2011-266856 filed on Dec. 6, 2011, the content of which is hereby incorporated by reference into this application.

TECHNICAL FIELD OF THE INVENTION

The present invention relates to an electronic apparatus, and more particularly relates to technique that is effectively applied to an electronic apparatus provided with a serial communication circuit in which a baud rate can be set.

BACKGROUND OF THE INVENTION

For example, Patent Document 1 (Japanese Patent Application Laid-Open Publication No. 11-272571) has proposed a method in which a command (for example, 8'h8C) representing a baud rate (for example, 76 kbps) of data is previously prepared and by using the baud rate based upon the command, data communication is carried out between the transmitting and receiving sides. On the transmitting side, in an attempt to set the baud rate to 76 kbps, the serial data 8'h8C is transmitted; and on the receiving side, by decoding and interpreting/recognizing this, the baud rate of its own is set to 76 kbps.

Moreover, Patent Document 2 (Japanese Patent Application Laid-Open Publication No. 2011-35473) has disclosed a baud rate error detection circuit that detects an abnormal waveform of a sync field in serial communication. First, the circuit generates an edge detection signal in response to an edge in the serial data, and based upon the edge detection signal, measures a bit width of a start bit so as to generate an expected value representing the measured bit width. Next, the width between edges after the start bit is successively measured so that, when an error from the expected value exceeds a permissible range, this state is determined as an abnormal state.

SUMMARY OF THE INVENTION

For example, as a debug system for a built-in apparatus (electronic apparatus) provided with a semiconductor integrated circuit device (IC chip) such as an MCU (Micro Control Unit), a system has been known in which a JTAG (Joint Test Action Group) interface or the like installed in the IC chip is utilized. When this system is used, an external inspection device is allowed to access to a processor or the like in the IC chip through the JTAG interface having a plurality of external terminals, such as, for example, TCK, TDI, TDO and TMS, so that it becomes possible to carry out a program debugging process or the like, while confirming the internal state of the processor or the like on demand. However, in the case when the JTAG interface is used, since the plural external terminals are required, the circuit area (costs) of the IC chip (as well as the electronic apparatus) might increase. For this reason, it is desired to achieve such a debugging function in a serial communication circuit typically represented by a UART (Universal Asynchronous Receiver Transmitter), etc., by using a single communication line of a half-duplex system.

Since the UART is a system that carries out a serial communication in an asynchronous manner, it is necessary to carry out a communication after a baud rate has been previously set on each of the IC chip (device to be inspected) side and the inspection device side. In other words, the inspection device and the device to be inspected are provided with respectively independent reference clock generation circuits, with the result that even in a state where they are simply connected to each other, the devices are operated based upon clocks having mutually different frequencies and in this state, they are not allowed to recognize the mutual clock frequencies. Therefore, for example, as described in Patent Document 1, a system has been proposed in which, by using a common command representing the baud rate, the same baud rate is set between the inspection device and the device to be inspected. In this system, however, it is necessary to stabilize both of reference clocks on the receiving side and transmitting side and also to previously confirm the mutual reference clock frequencies. In the case when the mutual reference clock frequencies are not confirmed, the initial transmitting and receiving processes of a baud rate setting command might not be carried out correctly.

In order to prevent such a situation, a system is proposed in which a sync field is previously prepared inside the serial data, and by measuring the pulse width of the sync field sent from the transmitting side on the receiving side, the baud rate is automatically adjusted. Patent Literature 2 has proposed a circuit which, in the case when there is an abnormal waveform in this sync field, detects the abnormal waveform. The circuit measures a reference baud rate by a start bit, and by using this as an expected value, the quality of an edge distance (pulse width) successively measured after the start bit is determined so that an abnormal waveform is detected. However, in the case when an attempt is made to adjust the baud rate by using not a data bit, but a start bit, since the edge distance after the start bit is made different from that of the start bit, for example, when the inclinations of the rise/falling edges of the serial data are different, the baud rate adjusting precision might be lowered.

Moreover, in Patent Document 2, a serial communication protocol, such as LIN (Local Interconnect Network) or the like, is used. In the LIN protocol, one frame is composed of a header and a response, and the above-mentioned sync field (data of 8'h55) is contained in the header. In this case, each time the frame is transmitted, a baud rate adjustment is carried out by the sync field; however, during the debugging communication between the abovementioned IC chip and the inspection device, carrying out the above-mentioned baud rate adjustment every time causes a reduction in the communication efficiency.

For example, by installing a reference clock generation circuit with high precision typically represented by a quartz oscillation circuit in the IC chip, the communication efficiency can be improved in some cases because the frequency setting error between the transmitting and receiving sides is maintained in a small level for a comparatively long period of time by once carrying out a baud rate adjustment. However, in order to reduce debugging costs and the like, it is desirable to realize the debugging function by using not a quartz oscillation circuit or the like that requires externally added parts such as a quartz oscillator, but a reference clock generation circuit with a comparatively low precision that is built in the chip. In this case, however, the frequency setting error between transmitting and receiving sides is gradually expanded, with the result that a normal communication state might not be maintained without re-adjusting the baud rate. In this manner, the improvement of communication efficiency and the high precision of the baud rate adjustment sometimes cause a trade-off relationship. Thus, it is desirable to achieve a serial communication system taking the balance of these into consideration.

In view of these problems, the present invention has been devised, and one of its preferred aims is to achieve a baud rate adjustment in an electronic apparatus provided with a serial communication circuit. The above and other preferred aims and novel characteristics of the present invention will be apparent from the description of the present specification and the accompanying drawings.

The typical ones of the inventions disclosed in the present application will be briefly described as follows.

An electronic apparatus in accordance with one embodiment of the present invention carries out serial communication with another apparatus having a communication function. The electronic apparatus is provided with: a serial interface circuit that includes a baud rate adjusting circuit and carries out serial communication with the other apparatus; and a clock generation circuit that generates an internal clock signal so that the electronic apparatus is connected to the other apparatus and allowed to receive a serial signal from the other apparatus. In this structure, the serial signal is composed of a start bit of 1 bit, data bits having a plurality of bits that succeed the start bit and a stop bit of 1 bit that succeeds the data bits. In this case, the baud rate adjusting circuit executes a process for measuring a time width of each of bits forming the received serial signal by using counting operations of the internal clock signal, and calculates an average value of the time widths, as well as detecting a maximum value and a minimum value in the time widths. Moreover, the baud rate adjusting circuit calculates a maximum tolerance and a minimum tolerance based upon the average value, and determines whether or not the maximum value and the minimum value are located within the range between the maximum tolerance and the minimum tolerance. When they are within the range, the baud rate adjusting circuit sets a baud rate corresponding to the average value, and the electronic apparatus carries out serial communication with the other apparatuses at a baud rate thus determined.

According to the above embodiment, it is possible to achieve a baud rate adjustment with high precision in an electronic apparatus provided with a serial communication circuit.

BRIEF DESCRIPTIONS OF THE DRAWINGS

FIG. 8A is a waveform diagram in the case of no error, illustrating detailed operational example of the baud rate adjusting circuit of FIG. 5;

FIG. 8B is a waveform diagram in the event of an error, illustrating detailed operational example of the baud rate adjusting circuit of FIG. 5;

FIG. 15 is a conceptual drawing illustrating one example of a reset function which the on-chip debug circuit of FIG. 2 is provided with;

FIG. 16 is an explanatory drawing illustrating one example of various resetting sources in FIG. 15 and their effective ranges;

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Moreover, while the circuit elements configuring each functional block in the embodiments are formed on, although not limited to this, a semiconductor substrate like single crystal silicon by known integrated circuit technology of a CMOS (complementally MOS transistor) etc. Note that, while a MOSFET (metal oxide semiconductor field effect transistor) is used as an example of a MISFET (metal insulator semiconductor field effect transistor), a non-oxide film is not excluded from examples of a gate insulator.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<<Overall Structure of Semiconductor Integrated Circuit Device>>

Figure 1:
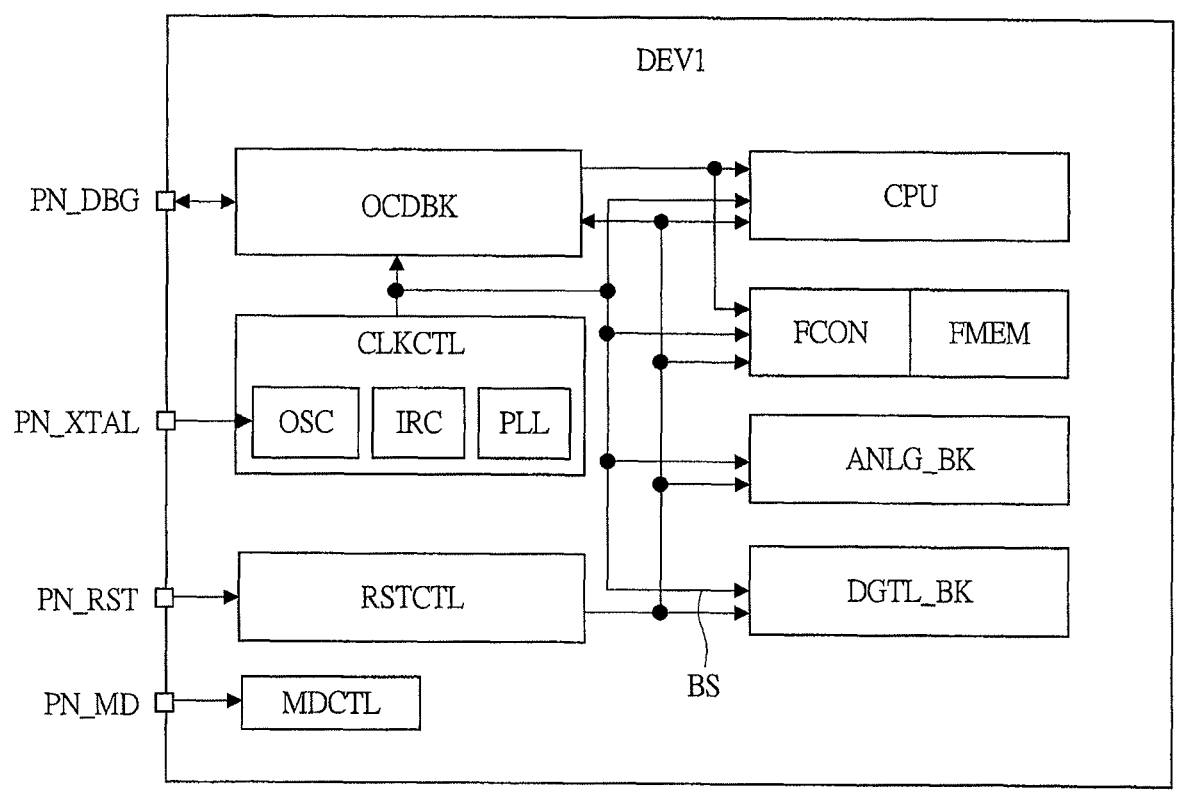
FIG. 1 is a block diagram illustrating a structural example of a semiconductor integrated circuit device included in an electronic apparatus according to one embodiment of the present invention.

FIG. 1 is a block diagram illustrating a structural example of a semiconductor integrated circuit device included in an electronic apparatus according to one embodiment of the present invention. Although not particularly limited, a semiconductor integrated circuit device DEV1 illustrated in FIG. 1 is formed as an MCU (Micro Control Unit) or the like, for example, constituted by one semiconductor chip (IC chip). Although not particularly limited, the DEV1 is used as, for example, one part of a built-in apparatus (electronic apparatus) or the like in which a plurality of parts are mounted on a printed circuit board. The DEV1 of FIG. 1 is provided with a processor unit CPU, a flash memory FMEM, a flash controller FCON, an analog circuit block ANLG_BK, a digital circuit block DGTL_BK, an on-chip debugging control block OCDBK, a clock control circuit block CLKCTL, a reset control circuit RSTCTL and a mode control circuit MDCTL. The CPU, FCON, ANLG_BK, DGTL_BK, OCDBK and CLKCTL are mutually connected with one another by an internal bus BS.

The flash controller FCON controls an access (read access/write access) to the flash memory FMEM that is carried out through the internal bus BS on demand. In the FMEM, for example, predetermined programs and various kinds of data, etc., in association with those programs are stored. The processor unit CPU reads a predetermined program or the like, for example, from the FMEM through the FCON, and executes predetermined operation processes, etc., based upon the programs, etc. The analog circuit block ANLG_BK includes various analog circuits, that is, typically, an analog-digital conversion circuit, a digital-analog conversion circuit, various sensor circuits, etc. The digital circuit block DGTL_BK includes various digital circuits, that is, typically, a timer circuit, a direct memory access controller, various kinds of external serial communication control circuits, etc. Additionally, the DGTL_BK includes a work-use RAM (Random Access Memory), etc. for use in executing a program or the like of the CPU.

The clock control circuit block CLKCTL is provided with an oscillation circuit OSC, a self-excited oscillation circuit IRC, a phase synchronous circuit PLL, etc. The OSC is, for example, a quartz oscillation circuit or the like, and generates a reference clock signal having a predetermined oscillation frequency based upon a quartz oscillator (not shown) or the like connected to an external terminal PN_XTAL. The self-excited oscillation circuit IRC is typically a ring oscillator circuit or the like constituted by inverter circuits of a plurality of stages, which generates a reference clock signal by an application of power to the DEV1 without the necessity of any external parts. Not limited to the ring oscillator circuit, the IRC may be a CR oscillation circuit or the like that generates a reference clock signal by utilizing, for example, the internal resistance and internal capacity. Based upon a reference clock signal generated by the OSC or IRC, the PLL generates an inner clock signal having a frequency of its multiplication (typically, multiplied by an integer, or in some cases, by a scale factor including the decimal point). The corresponding internal clock signal is supplied to the OCDBK, CPU, FCON, ANLG_BK and DGTL_BK on demand.

The mode control circuit MDCTL switches operation modes of the entire DEV1 in accordance with a mode switching signal inputted from the external terminal PN_MD. For example, the DEV1 is provided with a normal operation mode and a debug operation mode. In the normal operation mode, based upon a program or the like inside the FMEM determined by the user, the DEV1 realizes a desired function by using various kinds of internal circuits. On the other hand, in the debug operation mode that is used, for example, for developing (debugging) programs themselves inside the FMEM to be used in the normal operation mode, the DEV1 makes the on-chip debugging control block OCDBK effective and also sets the various kinds of internal circuits of the DEV1 to a state capable of debugging.

The on-chip debugging control block OCDBK is provided with various kinds of functions required for debugging the DEV1 through the debugging external terminal PN_DBG. The OCDBK, a detailed description of which will be given later, is provided with, for example, a part of an access function from the PN_DBG to the internal resister of the CPU and a part of an access function from the PN_DBG to the FMEM. The reset control circuit RSTCTL carries out a resetting process on each of various kinds of internal circuits inside the DEV1 in response to a reset signal from the external terminal PN_RST. Moreover, the RSTCTL is provided with, for example, a power-on reset circuit so that, upon detection of power application to the DEV1, a resetting process is carried out on each of the various kinds of internal circuits inside the DEV1.

<<Structure of Main Portion of Serial Communication System (Debug System)>>

Figure 2:
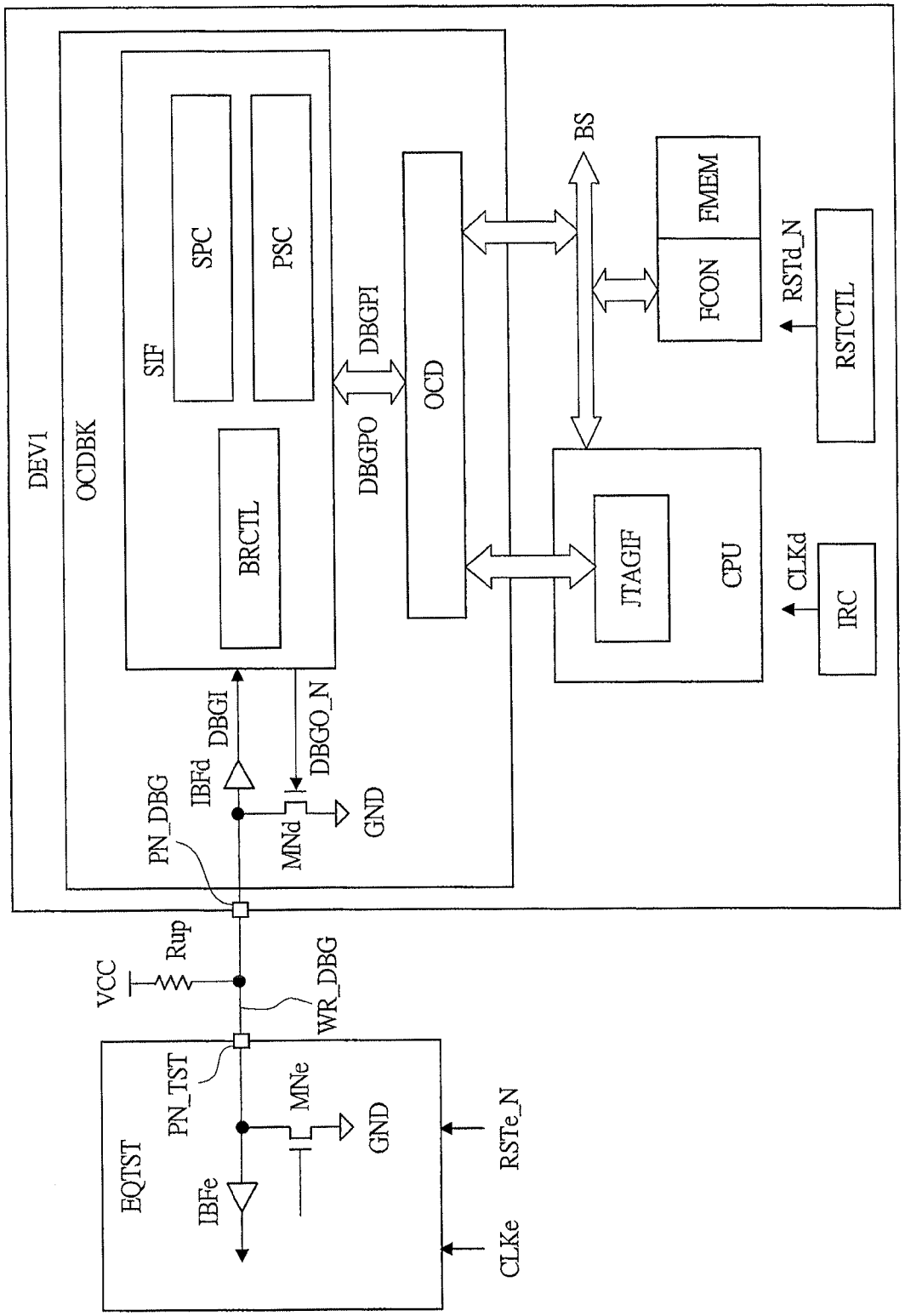
FIG. 2 is a block diagram illustrating a structural example of a main portion of a serial communication system (debug system) including the semiconductor integrated circuit device of FIG. 1.

FIG. 2 is a block diagram illustrating a structural example of a main portion of a serial communication system (debug system) including the semiconductor integrated circuit device of FIG. 1. FIG. 2 illustrates structural examples of portions relating to debugging in the semiconductor integrated circuit device DEV1 of FIG. 1 and the external inspection device EQTST to be used for debugging. The testing external terminal PN_TST of the EQTST and the debugging external terminal PN_DEG of DEV1 are connected to each other through one serial wire WR_DBG so that the EQTST and DEV1 perform half-duplex bilateral serial communications through the WR_DBG. In this case, the WR_DBG is pulled up to a power-supply voltage VCC through a pull-up resistor Rup.

Although not particularly limited, the EQTST is prepared as, for example, a personal computer or the like, and an NMOS transistor (open drain output buffer circuit) MNe with coupled source-drain paths and an input buffer circuit IBFe having the PN_TST as its input terminal are installed between the external terminal PN_TST and the grounded power-supply voltage GND. The EQTST carries out transmitting and receiving operations through the PN_TST in synchronism with a clock signal CLKe. For example, upon transmitting an "H" level, the gate of the MNe is driven to an OFF level, while upon transmitting an "L" level, the gate of the MNe is driven to an ON level, and, in the case of a receiving operation, a logic level of the PN_TST is taken in through the IBFe.

As also illustrated in FIG. 1, the semiconductor integrated circuit device DEV1 is provided with the on-chip debugging control block OCDBK, the processor unit CPU, the flash controller FCON as well as the flash memory FMEM, the self-excited oscillation circuit IRC and the reset control circuit RSTCTL. The IRC generates an internal clock signal CLKd by using, for example, the phase synchronous circuit PLL as illustrated in FIG. 1, and the RSTCTL generates an internal reset signal RSTd_N. The CPU is provided with a JTAG interface circuit JTAGIF that achieves an access to each of the internal resistors, etc. of the CPU based upon the JTAG (Joint Test Action Group) standard.

The OCDBK is provided with an NMOS transistor (open-drain output buffer circuit) MNd, an input buffer circuit IBFd, a serial interface circuit SIF and an on-chip debug circuit OCD. In the same manner as in the case of the EQTST, the MNd has coupled source-drain paths located between the external terminal PN_DBG and the GND so that the gate is driven in response to the transmitted serial data DBGO_N. Moreover, the IBFd acquires data of the PN_DBG at the time of a receiving operation, and outputs received serial data DBGI. The serial interface circuit SIF is provided with a baud rate adjusting circuit BRCTL, a serial-parallel conversion circuit SPC and a parallel-serial conversion circuit PSC.

Upon a receiving operation, the serial-parallel conversion circuit SPC converts the above-mentioned received serial data DBGI to received parallel data DBGPI. At the time of a transmitting operation, the parallel-serial conversion circuit PSC converts transmitted parallel data DBGPO to the above-mentioned transmitted serial data DBGO_N. The baud rate adjusting circuit BRCTL detects a baud rate from the received serial data DBGI, and sets an operation timing of the SPC and PSC based upon the result of the detection. In this case, the operation timing, which will be described later in detail, is determined by the counted number of the internal clock signal CLKd. The on-chip debug circuit OCD alters a debugging internal state in accordance with the value (command) of the received parallel data DBGPI. In the debugging internal state, which will be described later in detail, an idle state, a JTAG accessing state and a flash access state are included.

Figures 3, 4:
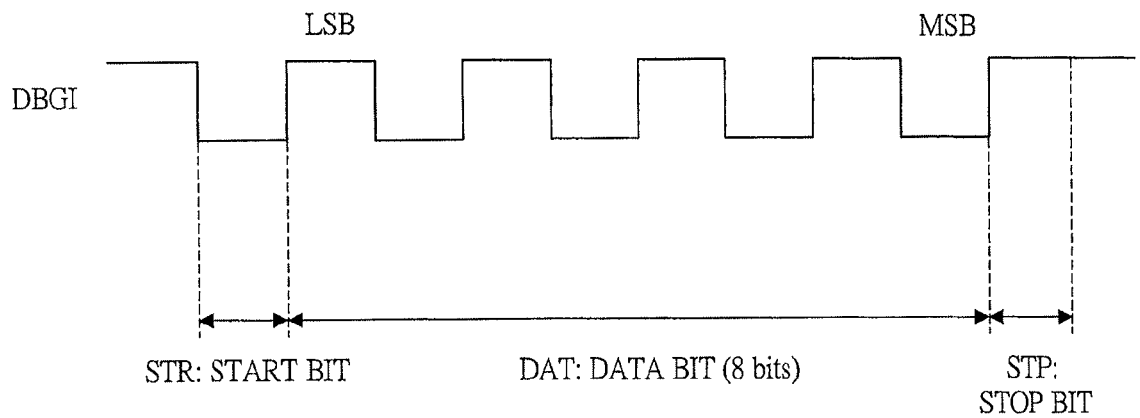
FIG. 3 is an explanatory drawing illustrating one example of commands that are identified by an on-chip debugging control block of FIG. 2.
FIG. 4 is an explanatory drawing illustrating one example of a serial communication data format in the serial communication system (debug system) of FIG. 2.

FIG. 3 is an explanatory drawing illustrating one example of commands that are identified by an on-chip debugging control block of FIG. 2. With respect to detailed contents of the respective commands of FIG. 3, explanations thereof will be sequentially given later, and the outline thereof will be explained below. Upon receipt of a command "8'h55" at a hexa (hexadecimal number) (8'h) of 8 bits or a command "8'h55" following a command "8'h65" as the received serial data DBGI, the on-chip debugging control block OCDBK carries out a baud rate adjusting process by using the baud rate adjusting circuit BRCTL. The former is used when a fine adjustment is carried out on a baud rate, and the latter is used when the baud rate is altered in a comparatively large level.

Upon receipt of a command "8'hEA" or a command "8'h6A" as the DBGI, the OCDBK proceeds to a flash access state through the on-chip debug circuit OCD. Upon transition to the flash access state by the command "8'h6A", the OCD writes received parallel data DBGPI corresponding to a predetermined number of times from the serial interface circuit SIF inputted thereto later in the FMEM through the flash controller FCOM. On the other hand, upon transition to the flash access state by the command "8'hEA", the OCD reads data corresponding to a predetermined number of times from the FMEM through the FCON, and transmits the parallel data to the SIF as the DBGPO.

Upon receipt of a command "8'bxxxxxx00" (x: don't care) as binary data (binary number) (8'b) of 8 bits as the DBGI, the OCDBK proceeds to a JTAG accessing state through the OCD. In the JTAG accessing state, the OCD protocol-converts the DBGPI from the serial interface circuit SIF to a format on the basis of the JTAG standard, and transmits the signal after the conversion to the JTAGIF of the CPU. In this case, data corresponding to 8 bits is transmitted to the JTAGIF. Moreover, the OCD collects data accordingly sent from the JTAGIF (data corresponding to 8 bits in this case) sequentially, and transmits the resulting data to the SIF as the DBGPO. Upon receipt of a command "8'hFF" as the DBGI, the OCDBK generates a reset signal. Additionally, the command assigning processes of FIG. 3, which will be described later in detail, are characterized in that operations can be roughly distinguished by the lower two bits.

As described above, by using the debug system as shown in FIG. 2, accessing processes to the respective internal resistors of the CPU and the flash memory FMEM, etc. inside the semiconductor integrated circuit device DEV1 are available from the external inspection device EQTST through the serial wiring WR_DBG. With this arrangement, for example, it is possible to realize a debugging process or the like of the programs stored in the FMEM confirming the states of the respective internal resistors, etc. of the CPU. At this time, since this system carries out the debugging process by using the single terminal (PN_DBG), it is possible to miniaturize the DEV1 and achieve a reduction of debugging costs and the subsequent cost reduction of the DEV1, for example, in comparison with a debugging system by using a plurality of terminals possessed by the JTAG interface.

Moreover, since this system carries out debugging communications between the EQTST and the DEV1 by using the internal clock signal CLKd from the self-excited oscillation circuit IRC that does not require any external quartz oscillator or the like, it is also possible to reduce debugging costs or the like because of this arrangement. In this case, however, since the IRC typically represented by a ring oscillator or the like might cause an error of, for example, about ±10% between the respective semiconductor chips, when production deviations and deviations due to temperatures and voltages are taken into consideration. For this reason, in order to ensure the communications between the EQTST and the DEV1, an attempt needs to be made so as to maintain a state in which an error in operation timings between the EQTST and the DEV1 is kept within a range in a certain degree during the debugging period. One system for this is to provide a sync field to each of the frames as proposed in Patent Document 2; however, in this case, the sync field located in each frame might cause a reduction in communication efficiency. Therefore, the application of the system in accordance with the present embodiment is advantageous.

<<Format of Serial Communication Data>>

FIG. 4 is an explanatory drawing illustrating one example of a format of serial communication data in the serial communication system (debug system) of FIG. 2. As shown in FIG. 4, through the serial wiring WR_DBG between the external inspection device EQTST and the semiconductor integrated circuit device DEV1, serial communication data having a unit (1 field) of total 10 bits including a start bit (1 bit) STR and a stop bit (1 bit) STP, as well as data bits (8 bits) DAT located in between is transmitted. The start bit STR is in the "L" level and the stop bit STP is in the "H" level, and each of these has a period corresponding to 1 bit. Moreover, in this case, the DAT is successively transmitted from the least significant bit (LSB) toward the most significant bit (MSB).

<<Detailed Configuration of Baud Rate Adjusting Circuit>>

Figure 5:
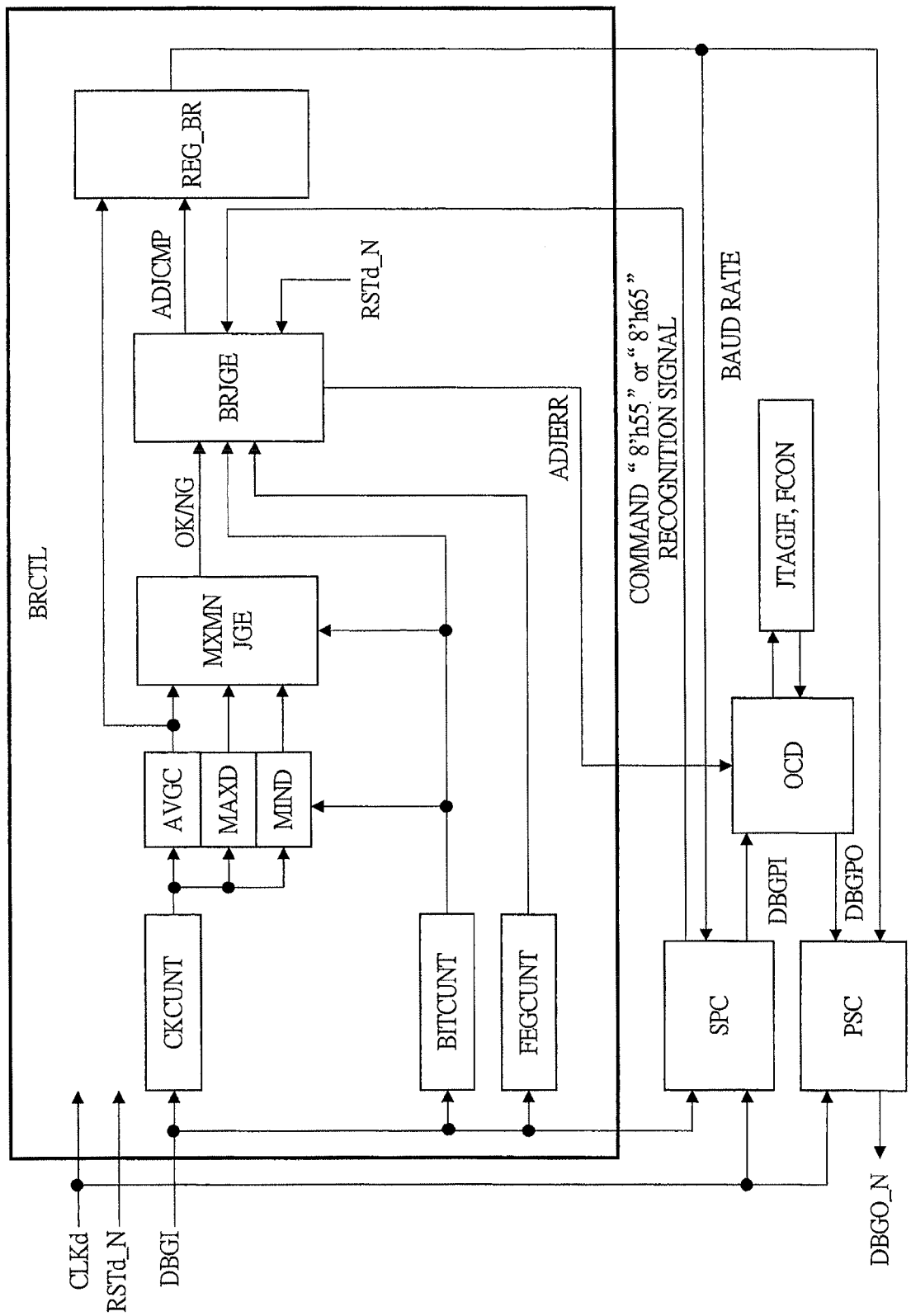
FIG. 5 is a block diagram illustrating a detailed structural example of a baud rate adjusting circuit in the semiconductor integrated circuit device of FIG. 2.

FIG. 5 is a block diagram illustrating an example of a detailed configuration of a baud rate adjusting circuit in the semiconductor integrated circuit device of FIG. 2. The baud rate adjusting circuit BRCTL of FIG. 5 is provided with a clock counter CKCUNT, a bit counter BITCUNT and a falling edge counter FEGCUNT. The CKCUNT, BITCUNT and FEGCUNT carry out counting operations for each of the fields of the received serial data DBGI shown in FIG. 4, and when the field is changed, reset the counted values. In this case, the detection of each of the fields is carried out by a circuit, not shown, that detects the start bit STR and the stop bit STP. The CKCUNT counts each of edge periods (that is, each 'H' pulse width and each 'L' pulse width) that are adjacent to each other in the DBGI by using the internal clock signal CLKd. The BITCUNT counts the number of edges in the DBGI. The FEGCUNT counts the number of falling edges in the DBGI.

The baud rate adjusting circuit BRCTL of FIG. 5 is further provided with an average value computing unit AVGC, a maximum value detection unit MAXD, a minimum value detection unit MIND, a tolerance determination unit MXMNJGE, a baud rate setting availability determination unit BRJGE and a baud rate setting register REG_BR. The AVGC computes the average value of the respective counted numbers by the CKCUNT. The MAXD detects and holds the maximum value of the respective counted numbers of the CKCUNT, and the MIND detects and holds the minimum value of the respective counted numbers of the CKCUNT. The MXMNJGE computes the maximum tolerance and the minimum tolerance from the operation results of the AVGC, and determines the quality of the maximum value by the MAXD and the minimum value by the MIND based upon the respective tolerances as criteria. More specifically, in the case when the maximum value by the MAXD and the minimum value by the MIND are kept within the range of the maximum tolerance and the minimum tolerance given by the MXMNJGE, it outputs an OK signal, while in the case when they are out of the range, it outputs an NG signal.

In the case when the counted number of the falling edge counter FEGCUNT is a predetermined number of times and the OK signal is outputted from the tolerance determination unit MXMNJGE, the baud rate setting availability determination unit BRJGE outputs a setting completion signal (enable signal) ADJCMP. In contrast, in the case when the counted number of the FEGCUNT is a predetermined number and the NG signal is outputted from the tolerance determination unit MXMNJGE, it outputs an error signal ADJERR. In this case, while the detailed description thereof will be given later, the BRJGE carries out the generation of the ADJCMP and ADJERR, with the recognition results of the command "8'h55"/command "8'h65" by the serial-parallel conversion circuit SPC (or the on-chip debug circuit OCD) and the input circumstance of the internal reset signal RSTd_N being taken into account. In the case when the ADJCMP is generated, the baud rate setting resister REG_BR stores the operation results of the average value computing unit AVGC so as to update the baud rate setting value.

<<Basic Operation of Baud Rate Adjusting Circuit>>

Figure 6:
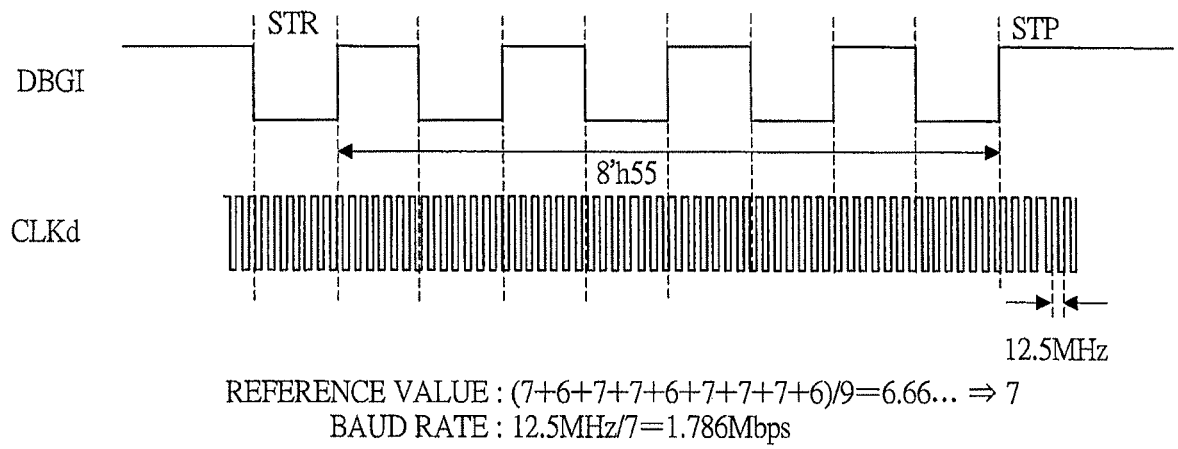
FIG. 6 is an explanatory drawing illustrating an operational example of a clock counter and an average value computing unit in the baud rate adjusting circuit of FIG. 5.

The baud rate adjusting circuit BRCTL of FIG. 5 schematically carries out its operations, for example, in the following manner. FIG. 6 is an explanatory drawing illustrating an example of operations of the clock counter and the average value computing unit in the baud rate adjusting circuit of FIG. 5. As shown in FIG. 6, in order to improve the setting precision of the baud rate, the clock counter CKCUNT inside the baud rate adjusting circuit BRCTL counts the total 9 bits of the start bit STR and the baud rate adjusting command "8'h55" by the internal clock signal CLKd so that the time width of each bit is measured. The average value computing unit AVGC calculates an average value by dividing the total value of the time widths of the respective bits by the bit number (9 in this case) corresponding to the measured portion so that the calculated result is set as a reference value. Additionally, although not particularly limited thereby, the decimal part of the division result is rounded off.

In the example of FIG. 6, the clock counted numbers corresponding to 9 bits are represented by (7+6+7+7+6+7+7+7+6), and the result obtained by dividing the number by 9 is rounded off, thereby obtaining "7" as a reference value. In this case, the baud rate becomes 1.786 Mbps corresponding to the result obtained by dividing the clock frequency of the internal clock signal CLKd (in this case, supposed to be 12.5 MHz) by "7". Although not particularly limited, the clock frequency of the CLKd (reference clock frequency of IRC of FIG. 1) is preferably set to a value lower than the reference clock frequency (for example, about 20 MHz) of the OSC of FIG. 1 in a certain degree. With this arrangement, by carrying out the timing designing of the semiconductor integrated circuit DEV1 with the reference frequency of the OSC being taken into account, it becomes possible to operate the DEV1 based upon the CLKd without causing any problem, even if the clock frequency of the CLKd should be fluctuated.

Figure 7:
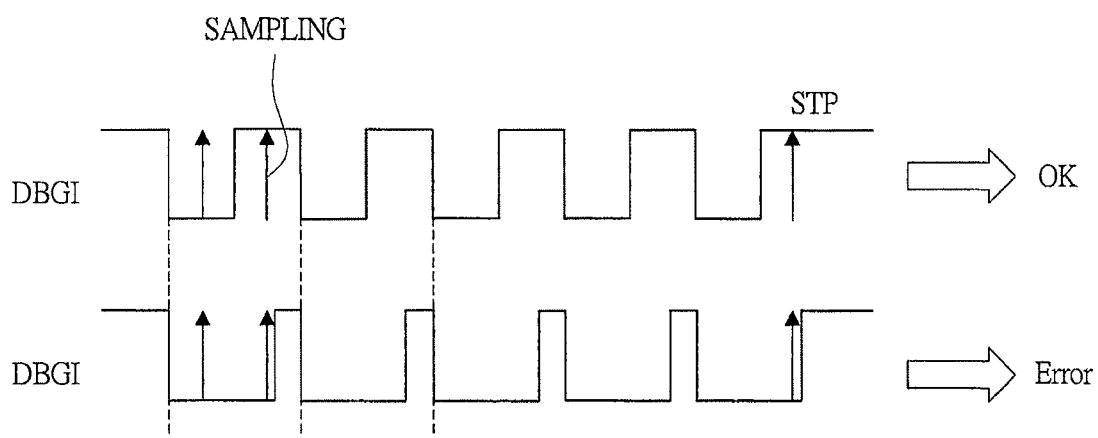
FIG. 7 is an explanatory drawing illustrating one example in which a reference value calculated in FIG. 6 causes an error.

FIG. 7 is an explanatory drawing illustrating one example of a situation in which the reference value calculated in FIG. 6 causes an error. As illustrated in FIG. 7, in the case when the maximum value of the clock cycle number corresponding to 1 bit of the received serial data DBGI becomes larger than three times the minimum value, the baud rate adjusting circuit BRCTL detects an error by using the tolerance determination unit MXMNJGE without carrying out the setting of the baud rate based upon the reference value. This is because, as shown in FIG. 7, supposing that the value of each bit of the DBGI is detected by a sampling process in the center of the bit period, in the case when the ratio of pulse widths between the 'H' pulse and the 'L' pulse is out of a range from ⅓ to 3, a problem in which the sampling process is not correctly carried out and a problem in which it becomes difficult to detect the stop bit STP tend to arise.

In the case when the baud rate has been set using the reference value, the set value is maintained in the baud rate setting resister REG_BR until the next baud rate adjustment has been carried out (until the command "8'h55" has appeared), and used in the serial communication with the external detection device EQTST. On the other hand, in the case when the error signal ADJERR is generated by the baud rate setting availability determination unit BRJGE, the on-chip debug circuit OCD or the like outputs the 'H' level to the transmitted serial data DBGO_N, for example, for about 10 ms, as an error notification signal directed to the EQTST side. Additionally, although its detailed description is omitted, in addition to such a case in which the baud rate adjustment is failed, the error notification signal is also generated, for example, when the stop bit is not detected correctly or when transmitting and receiving processes are simultaneously carried out to cause the data to collide against each other.

FIGS. 8A and 8B illustrate a detailed operation example of the baud rate adjusting circuit of FIG. 5. FIG. 8A is a waveform diagram in which there is no error, and FIG. 8B is a waveform diagram in which there is an error. As illustrated in FIGS. 8A and 8B, the baud rate adjusting circuit BRCTL of FIG. 5 is more specifically operated, for example, in the following manner.

[1] In order to measure the baud rate corresponding to one bit of the received serial data DBGI to be transmitted from the external inspection device EQTST to the semiconductor integrated circuit device DEV1, the clock counter CKCUNT of FIG. 5 carries out a counting operation by using the internal clock signal CLKd (cycle_count) taking the first falling edge of the DBGI as a starting point. Moreover, in parallel with this operation, the bit counter BITCUNT of FIG. 5 detects the edge (rise/fall) of the DBGI, and carries out a counting up operation each time the detection is made (bit_count).

[2] After the completion of the counting operation for the total 9 bit period of the start bit (1 bit) STR and the data bit (8 bits) DAT by the clock counter CKCUNT, the average value computing unit AVGC of FIG. 5 computes the average value of clock count values per one bit by dividing the corresponding count value by the count value of the bit counter BITCUNT. In the example of FIG. 8A, the clock count value corresponding to 9 bits is represented by (8+7+8+7+8+8+7+8+8), and the result obtained by dividing the value by the count value (9 in this case) of the BITCUNT is rounded off so that "8" is obtained.

[3] Moreover, as shown in FIG. 7, in the case when the ratio of the 'L' pulse and the 'H' pulse of the received serial data DBGI becomes 3:1 (or 1:3) or more, a correct sampling process of data or a detection of the stop bit STP might become difficult. Therefore, as shown in FIG. 8A, the maximum value detection unit MAXD of FIG. 5 recognizes the count value of the CKCUNT for each bit based upon the count value of the clock counter CKCUNT and the edge detection signal by the bit counter BITCUNT, and detects and maintains the maximum value among these ("8" in this case) (max). In the same manner, based upon the count value of the CKCUNT and the edge detection signal by the BITCUNT, the minimum value detection unit MIND of FIG. 5 recognizes the count value of the CKCUNT for each bit, and detects and maintains the minimum value among these ("7" in this case) (min).

Moreover, as shown in FIG. 8A, based upon the value ("8" in this case) obtained by the average value computing unit AVGC, the tolerance determination unit MXMNJGE of FIG. 5 computes 0.5 times as much as the value ("4" in this case) (cycle_count_min) as a minimum tolerance, and also computes 1.5 times as much as the value ("C" in this case) (cycle_count_max) as a maximum tolerance. Then, in the case when both of the detected value of the maximum value detection unit MAXD and the detected value of the minimum value detection unit MIND are kept within the ranges of the minimum tolerance and the maximum tolerance determined by the tolerance determination unit MXMNJGE, it generates an OK signal. In contrast, in the case when at least either the detected value of the MAXD or the detected value of the MIND is out of the range of the minimum tolerance or the maximum tolerance by the MXMNJGE, it generates an NG signal.

[4] In the case when the OK signal is outputted from the tolerance determination unit MXMNJGE and when falling edges are detected 5 times by the falling edge counter FEGCUNT, the baud rate setting availability determination unit BRJGE of FIG. 5 generates a setting completion signal (enable signal) ADJCMP. In contrast, in the case when the NG signal is outputted from the MXMNJGE and when falling edges are detected 5 times by the FEGCUNT, it generates an error signal ADJERR. The FEGCUNT is installed so as to verify the fact that the command by the received serial data DBGI corresponds to the baud rate adjusting command "8'h55"

In the case of FIG. 8A, since both of the detected value ("8") of the MAXD and the detected value ("7") of the MIND are kept within the ranges of the minimum tolerance ("4") and the maximum tolerance ("C"), the OK signal is outputted from the tolerance determination unit MXMNJGE, and upon receipt of this, the baud rate setting availability determination unit BRJGE generates the setting completion signal (enable signal) ADJCMP. In contrast, in the case of FIG. 8B, since the detected value ("3") of the MIND is out of the range of the minimum tolerance ("4"), the NG signal is outputted from the MXMNJGE, and upon receipt of this, the BRJGE generates the error signal ADJERR without generating the ADJCMP. Note that, in the actual operation, the generation of the ADJCMP and ADJERR is carried out reflecting the command recognition result by the serial-parallel conversion circuit SPC and input situation of the internal reset signal RSTd_N.

[5] When the setting completion signal (enable signal) ADJCMP is generated from the baud rate setting availability determination unit BRJGE, the baud rate setting register REG_BR of FIG. 5 latches the operation result ("8" in this case) of the average value computing unit AVGC.

As described above, by detecting the baud rate based upon the average value of a plurality of bits as well as verifying the fact that the respective bits are kept within the range of 0.5 times to 1.5 times as much as the average value, it is possible to adjust the baud rate with high precision and also to verify the quality of waveforms. With this arrangement, it is possible to achieve serial communications with high reliability. Additionally, although the range from 0.5 times to 1.5 times is used in this case, the present invention is not intended to be limited by this range, and for example, a range from 0.6 times to 1.4 times may be used by taking a certain degree of margin into account.

<<Receiving and Transmitting Operations of Signal>>

The following description will explain receiving and transmitting operations of a signal based upon the baud rate setting by the baud rate adjusting circuit BRCTL. As illustrated in FIG. 5, the baud rate held in the baud rate setting register REG_BR is inputted to the serial-parallel conversion circuit SPC and the parallel-serial conversion circuit PSC. At the time of the receiving operation, the SPC converts the received serial data DBGI to the received parallel data DBGPI, with the received serial data DBGI being sampled by the baud rate, and transmits the resulting data to the on-chip debug circuit OCD. More specifically, the SPC counts the internal clock signal CLKd until the count value has reached the baud rate (reference value) of the REG_BR by using the counter installed inside thereof, and carries out the counting operations on portions corresponding to the total 10 bits of the start bit STR, the data bits DAT and the stop bit STP. Moreover, for each of the counting operations corresponding to these 10 bits, by carrying out a sampling process at a timing when the counted value corresponds to the center value of the reference value, the value of each bit is distinguished at the center position for each bit period.

On the other hand, at the time of the transmitting operation, the parallel-serial conversion circuit PSC acquires the transmitted parallel data DBGPO from the on-chip debug circuit OCD, and converts the data to transmitted serial data DBGO_N by the baud rate held in the baud rate setting register REG_BR. More specifically, the PSC counts the internal clock signal CLKd until the count value has reached the baud rate (reference value) of the REG_BR by using the counter installed inside thereof, and carries out the counting operations on portions corresponding to the total 10 bits of the start bit STR, the data bits DAT and the stop bit STP. Moreover, for each of the counting operations corresponding to these 10 bits, it successively transmits the respective bits of the DBGPO bit by bit.

<<Operation by Command of Baud Rate Adjusting Circuit>>

<Baud Rate Initial Setting (Command "8'h55" after Reset)>

When the internal reset signal RSTd_N is inputted in FIG. 5, the baud rate adjusting circuit BRCTL (more specifically, the baud rate setting availability determination unit BRJGE) proceeds to a baud rate setting operation mode. After the BRCTL (BRJGE) has proceeded to the baud rate setting operation mode, the external inspection device EQTST of FIG. 2 outputs a baud rate adjusting command "8'h55" as the received serial data DBGI. In the initial state, the EQTST and the semiconductor integrated circuit device DEV1 cannot identify operation frequencies with each other, resulting in a difficulty in receiving and transmitting commands. For this reason, under a rule in which after the resetting, the command "8'h55" is issued, the BRCTL detects a baud rate from the command "8'h55" after the resetting, as described in FIGS. 5 to 8, and sets the baud rate setting register REG_BR in the case when the OK signal is outputted by the tolerance determination unit MXMNJGE. Additionally, at this time, since the BRCTL (BRJGE) has a difficulty in recognizing the command in the initial state, it proceeds to a baud rate setting operation mode only based upon the RSTd_N by ignoring the command recognition signal from the serial-parallel conversion circuit SPC illustrated in FIG. 5.

<Correction of Baud Rate (Single Command "8'h55")>

Figure 9:
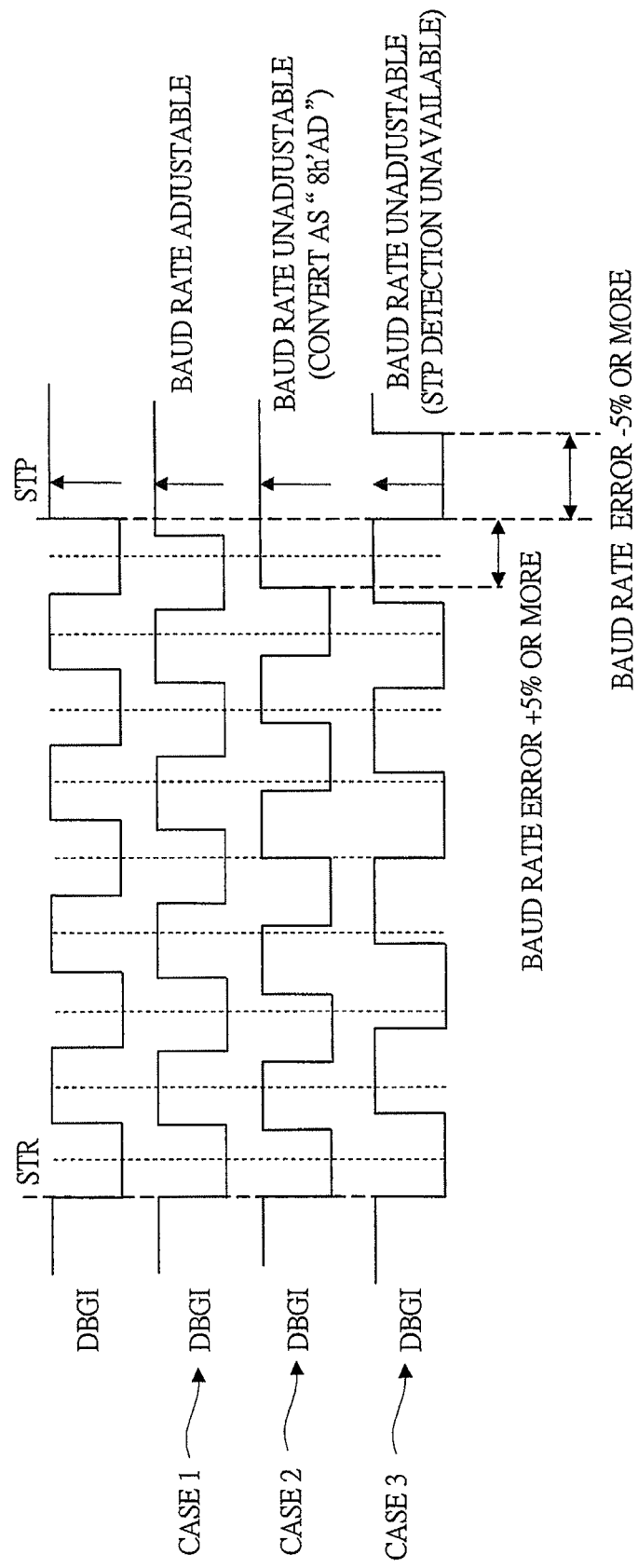
FIG. 9 is an explanatory drawing illustrating one example of influences from an error in a baud rate in the baud rate adjusting circuit of FIG. 5.

FIG. 9 is an explanatory drawing illustrating one example of influences from an error in a baud rate in the baud rate adjusting circuit of FIG. 5. As shown in Case 1 of FIG. 9, in the case when, supposing that the ratio of the pulse widths of the 'H' pulse and 'L' pulse is 1:1, the error in the baud rate is less than 5%, the data can be correctly converted in serial-parallel conversion. One of the reasons that the permissible error is 5% is, as illustrated in Case 3 of FIG. 9, that there is a possibility of failing to correctly detect the stop bit STP. Since the bit detection is carried out by sampling in the center of the bit period, there is a period corresponding to 9.5 bits from the falling of the start bit STR to the sampling of the stop bit STP. Supposing that there is an error of −5% between the baud rate of data to be transmitted and the set baud rate, the accumulated error at the time of detecting the stop bit STP causes a deviation of 50% of one bit with the result that the STP might not be detected correctly.

Moreover, another reason that the permissible error is set to 5% is, as shown in case 2 of FIG. 9, that there is a possibility of a difficulty in correctly carrying out a serial-to-parallel conversion. In the case when there is an error of +5% between the baud rate of data to be transmitted and the set baud rate, the serial-parallel conversion might not be carried out correctly with the result that the data might be converted to different data. In the example of Case 2 in FIG. 9, the data originally supposed to be converted to "8'h55" is actually converted to "8'hAD". Therefore, so as not to cause such an error of 5% or more, provision is made such that the baud rate adjusting circuit BRCTL is operated each time the received serial data DBGI is inputted so that when the value of DBGI is command "8'h55", the baud rate correction is carried out. That is, the frequency of the internal clock signal CLKd of FIG. 5 might have an expanded error with time due to, for example, temperature fluctuations, voltage fluctuations or the like. For this reason, the provision is made such that, when the error has reached 5% or more, command "8'h55" is singly issued regularly from the external inspection device EQTST toward the semiconductor integrated circuit device DEV1 so that the baud rate correction is carried out.

At this time, the baud rate correction is carried out as described in FIGS. 5 to 8; however, different from the above-described part "<Baud Rate Initial Setting>", it is necessary to determine whether or not the command is "8'h55" in a post-determination manner after the stop bit STP has been detected. For this reason, in FIG. 5, in the case when the command identification signal ("8'h55") is issued through the SPC (or OCD) and when falling edges are detected 5 times by the FEGCUNT and also the OK signal is outputted from the MXMNJGE, the baud rate adjusting circuit BRCTL (more specifically, BRJGE) updates the baud rate setting register REG_BR.

Figure 10:
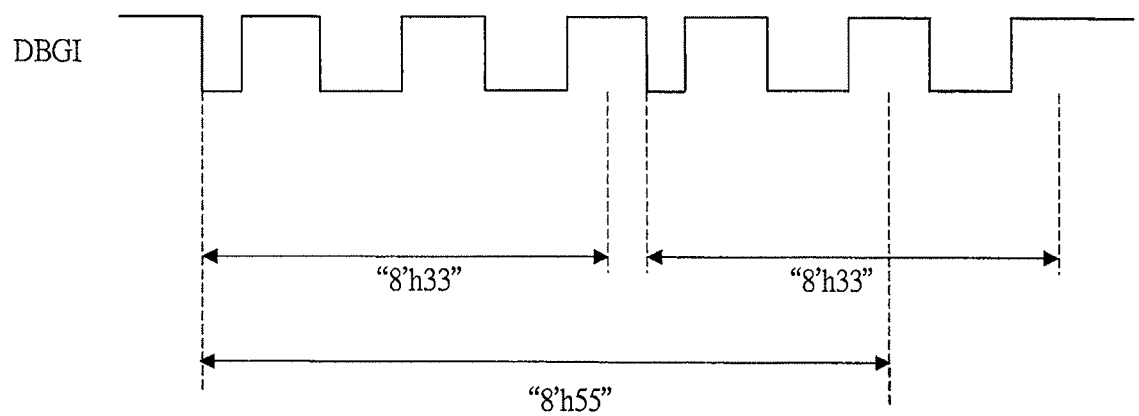
FIG. 10 is an explanatory drawing illustrating one example of a case in which a command erroneous recognition occurs in the baud rate adjusting circuit of FIG. 5.

In this case, if an attempt was made to identify the command ("8'h55") by using only the falling edge counter FEGCUNT, an erroneous recognition of the command "8'h55" might occur upon receipt of data, for example, as shown in FIG. 10. FIG. 10 is an explanatory drawing illustrating one example of a state in which the erroneous recognition of the command might occur in the baud rate adjusting circuit of FIG. 5. In the example of FIG. 10, the semiconductor integrated circuit device DEV1 continuously receives data of "8'h33" two times. These data "8'h33" of two fields sometimes look as if they were "8'h55" of one field. In this case, in accordance with the detections of falls of five times by the FEGCUNT, an erroneous interpretation as command "8'h55" might occur with the result that an erroneous baud rate correction might be carried out.

Therefore, in this case, the command identification result by the serial-parallel conversion circuit SPC (or the on-chip debug circuit OCD) is used in combination. Since the SPC carries out a command identification by a sampling process by the use of the baud rate that has been previously held by the baud rate setting resister REG_BR, the erroneous recognition of the command as illustrated in FIG. 10 can be prevented. Note that, in the case when the falling edge counter FEGCUNT is not installed, the verification of the command "8'h55" might be insufficient when the SPC fails to carry out a normal operation as in the case described in "<Baud Rate Initial Setting>" earlier; therefore, from this point of view, it is effective to install the FEGCUNT.

In the case when the frequency error of the internal clock signal CLKd is gradually expanded, normal serial communications can be maintained by carrying out regular baud rate corrections as described earlier; however, in such a case where the frequency error of CLKd is abruptly expanded for any reason, the baud rate correction might become difficult. If a frequency bias abruptly exceeds +5%, an error can be detected since the stop bit STP is not recognized correctly, as illustrated in FIG. 9. If a frequency bias abruptly exceeds −5%, the baud rate will not be corrected since the corresponding data is converted in the serial-parallel conversion circuit SPC as being data that is different from "8'h55".

<Baud Rate Alteration (Command "8'h65"→Command "8'h55")>

Figure 11:
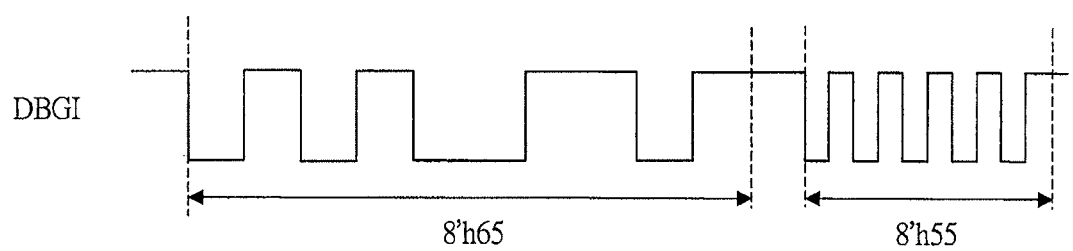
FIG. 11 is an explanatory drawing illustrating an operational example in which an attempt is made to alter a baud rate in the baud rate adjusting circuit of FIG. 5.

FIG. 11 is an explanatory drawing illustrating an operation example in the case when an attempt is made to alter the baud rate in the baud rate adjusting circuit of FIG. 5. For example, on the external inspection device EQTST side, in some cases, an attempt is desirably made so as to transmit data at a baud rate different from the currently set baud rate. As described in "<Baud Rate Correction>", in an attempt to alter the baud rate by 5% or more, it is difficult to alter the baud rate by using the single command "8'h55" since the command itself cannot be recognized.

In such a case, as illustrated in FIG. 11, after transmitting the command "8'h65" that is the premise by which the baud rate is adjusted at a baud rate prior to an alternation from the EQTST, the baud rate adjusting command "8'h55" is transmitted at a baud rate after the alteration. Thus, after recognizing the command "8'h65" through the serial-parallel conversion circuit SPC (or OCD), the baud rate adjusting circuit BRCTL (more specifically, baud rate setting availability determination unit BRJGE) transits to a baud rate setting operation mode in the same manner as in the internal reset signal RSTd_N in the above-described "<Baud Rate Initial Setting>". Thereafter, the baud rate alteration is carried out in the same manner as in the above-described "<Baud Rate Initial Setting>".

As described above, by preparing baud rate setting systems of three kinds, it becomes possible to set a desired baud rate with high precision between the external inspection device EQTST and the semiconductor integrated circuit device DEV1. Moreover, even in the case when an inexpensive oscillation circuit is used in the DEV1, it is possible to maintain a state capable of carrying out normal serial communications between the EQTST and the DEV1 for a sufficient period of time. At this time, since not a system for carrying out a baud rate correction by providing a sync field to each frame as described in Patent Document 2, but a system for carrying out a baud rate correction by issuing the command "8'h55" at a desired timing is used, the communication efficiency can be improved.

<<Detailed Description of on-Chip Debug Circuit>>

Figure 12:
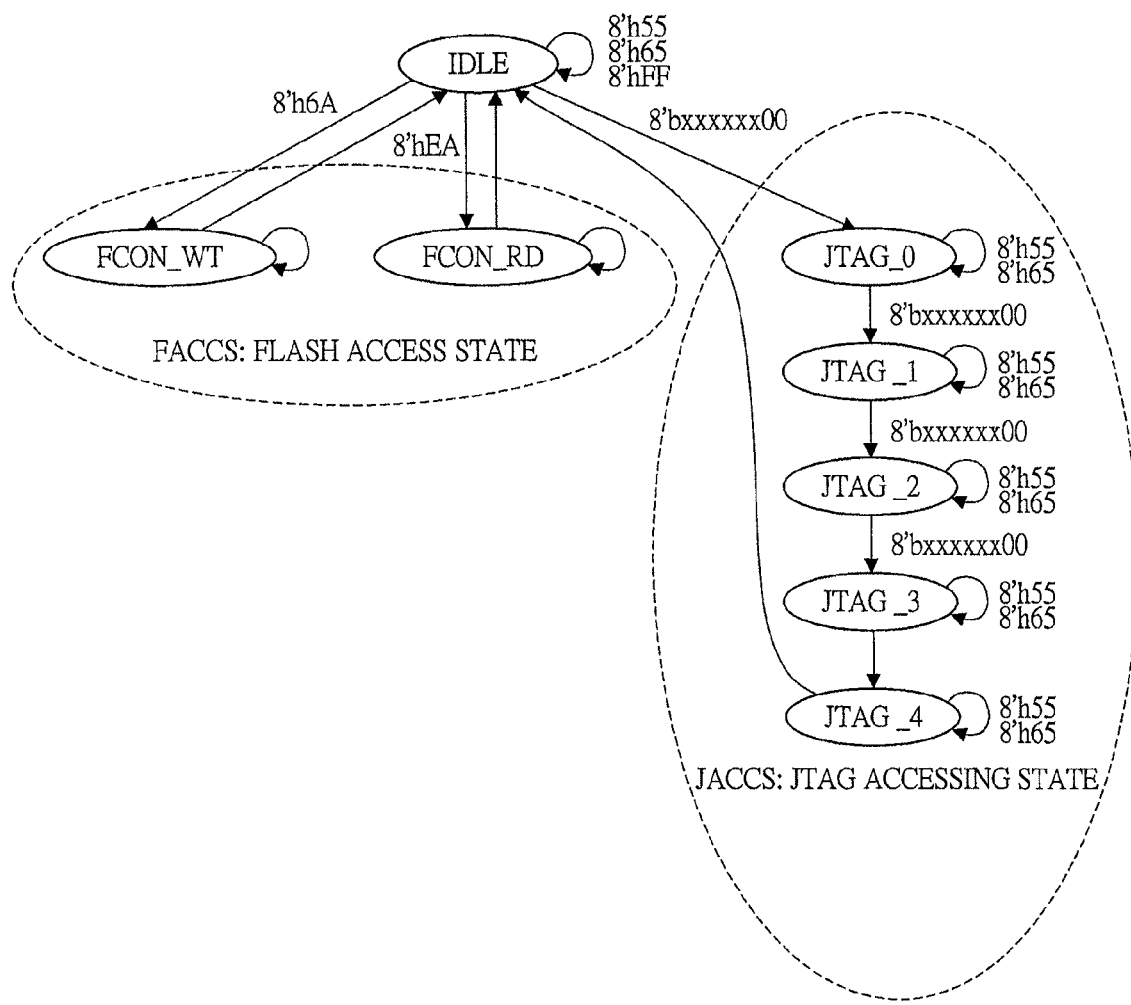
FIG. 12 is a state transition diagram illustrating a main operational example of an on-chip debug circuit in the on-chip debugging control block of FIG. 2.

FIG. 12 is a state transition diagram illustrating a main operational example of the on-chip debug circuit in the on-chip debugging control block of FIG. 2. As illustrated in FIG. 12, the on-chip debug circuit OCD is provided with an idle state IDLE, a flash access state FACCS and a JTAG accessing state JACCS. The FACCS is further provided with a flash controller write state FCON_WT and a flash controller read state FCON_RD. The JACCS is further provided with five JTAG sub-accessing states JTAG_0 to JTAG_4.

As described in FIG. 3 etc., in the case when the command "8'h55" or "8'h65" is inputted in the idle state IDLE, or when the command "8'hFF" is inputted in that state, the on-chip debug circuit OCD maintains the IDLE since the corresponding commands are the baud rate adjusting command and resetting commands. Moreover, in the case when the command "8'h6A" is inputted in the IDLE, the OCD transits to the flash controller write state FCON_WT, and in the case when the command "8'hEA" is inputted in this state, the OCD transits to the flash controller read state FCON_RD. As described with reference to FIG. 2, in the FCON_WT and FCON_RD, data transmitting and receiving processes are carried out between the serial interface SIF and the flash controller FCON (flash memory FMEM) through the OCD. In FIG. 12, after data transmitting and receiving processes of a predetermined number of times have been carried out during the period of FCON_WT or FCON_RD, the OCD returns to the idle state IDLE.

Moreover, in the case when the command "8'bxxxxxx00" is inputted in the idle state IDLE, the on-chip debug circuit OCD proceeds to the JTAG sub-accessing state JTAG_0. Thereafter, each time the command "8'bxxxxxx00" is successively inputted, the state transits to the JTAG sub-accessing state JTAG_1, JTAG sub-accessing state JTAG_2 and JTAG sub-accessing state JTAG_3, and after automatically proceeding to JTAG sub-accessing state JTAG_4, it returns to the idle state IDLE. In these JTAG_0 to JTAG_4, the baud rate adjusting command ("8'h55" or "8h65") is acceptable, and it is also possible to carry out the abovementioned baud rate correction and baud rate alteration, with the JTAG accessing being carried out. Additionally, in the JTAG accessing state JACCS, as described with reference to FIG. 2, data transmitting and receiving processes are carried out between the serial interface SIF and the JTAGIF inside the CPU through the OCD.

<<Details on Flash Access State>>

As described with reference to FIG. 12, etc., when the command "8'h6A" is transmitted from the external inspection device EQTST to the semiconductor integrated circuit DEV1, the DEV1 transits to the flash controller write state FCON_WT so that a direct write access from the EQTST to the internal resistor of the flash controller FCON can be carried out. Moreover, when the command "8'hEA" is transmitted from the EQTST to the DEV1, the DEV1 transits to the flash controller read state FCON_RD, thereby enabling a read access from the EQTST to the internal resistor of the flash controller FCON. The process onto the FCON is completed when the number of transferring data has reached a predetermined number of times set in a separated manner. Upon completion of the process onto the FCON, the DEV1 automatically gets out of this state, and returns to the idle state IDLE in which the baud rate adjustment can be carried out.

In this manner, in the flash access state FACCS, since a direct accessing process from the external inspection device EQTST to the internal resistor of the flash controller FCON is carried out without passing through the JTAG, etc. inside the semiconductor integrated circuit device DEV1, it is possible to carry out writing and reading process to and from the flash memory FMEM at high speeds. Thus, improvement and the like of the debug efficiency can be achieved.

Figure 13:
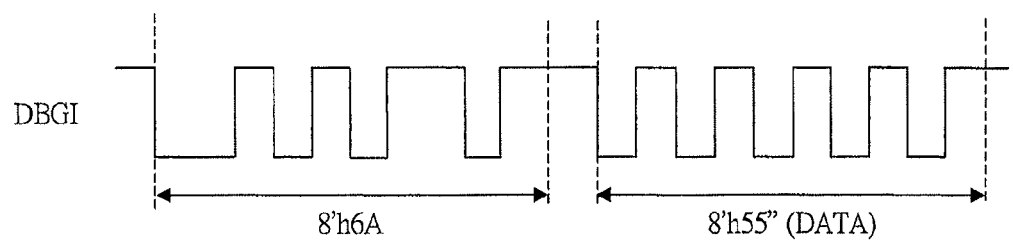
FIG. 13 is an explanatory drawing illustrating an operational example of a flash write access from an external inspection device toward the semiconductor integrated circuit device in the serial communication system (debug system) of FIG. 2.

FIG. 13 is an explanatory drawing illustrating an operational example of a flash write access from the external inspection device toward the semiconductor integrated circuit device in the serial communication system (debug system) of FIG. 2. As described with reference to FIG. 3 etc., since the command "8'h55" and command "8'h65" are prepared as the baud rate adjusting command and the premise command for adjusting the baud rate, it might become difficult to write data having the same value as that of the command to the flash memory FMEM. Therefore, as described in FIG. 12, etc., the flash access state FACCS is prepared so that the flash access is carried out during a period in this state; thus, instead the fact that the baud rate cannot be adjusted, as shown in FIG. 13, the "8'h55" and "8'h65" ("8'h55" in the example of FIG. 13) can be handled as data.

<<Detailed Description of JTAG Access State>>

Figure 14:
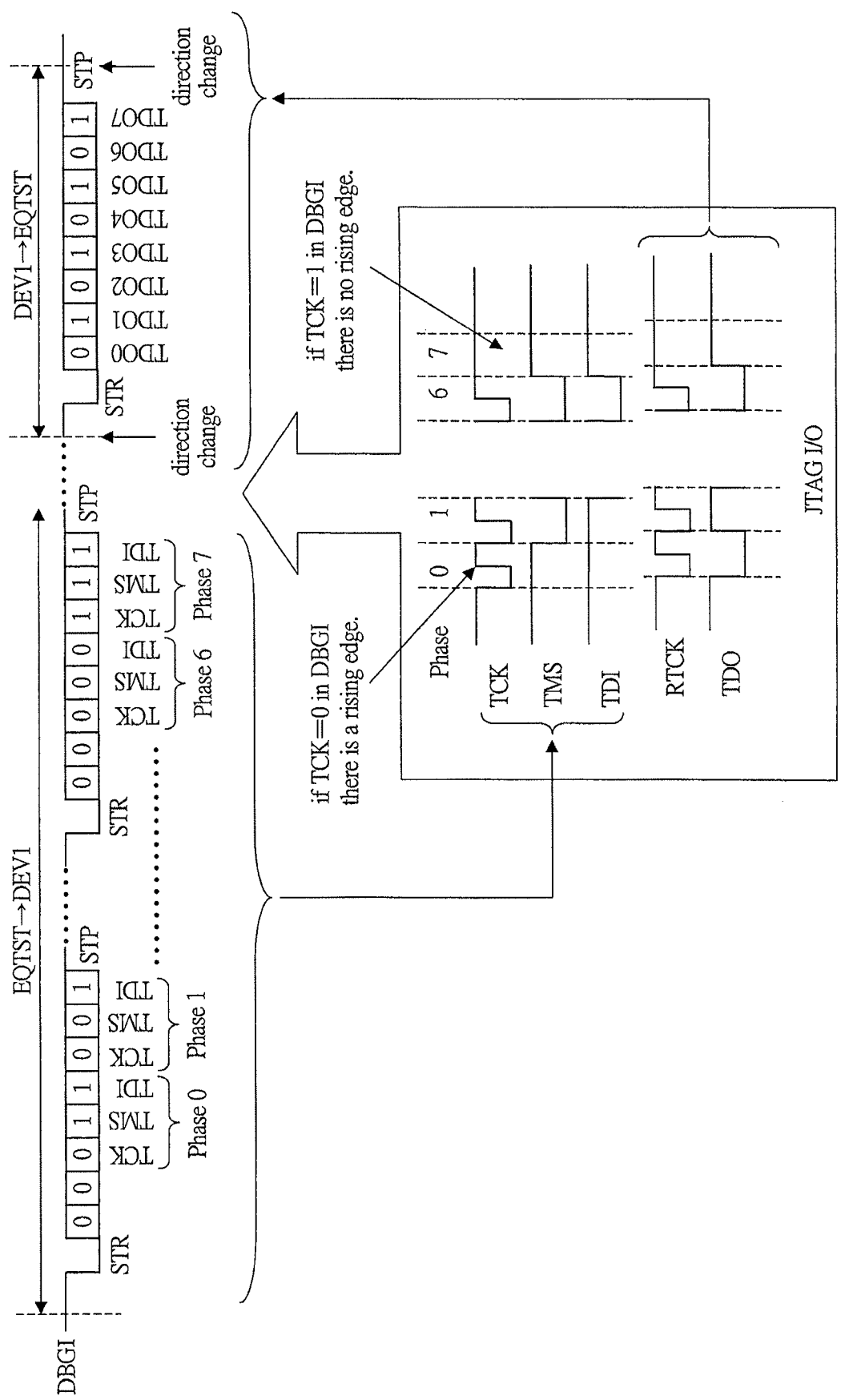
FIG. 14 is an explanatory drawing illustrating an operational example of a JTAG access from the external inspection device toward the semiconductor integrated circuit device in the serial communication system (debug system) of FIG. 2.

FIG. 14 is an explanatory drawing illustrating an operational example of a JTAG access from the external inspection device toward the semiconductor integrated circuit device in the serial communication system (debug system) of FIG. 2. As illustrated in FIG. 12, etc., by transmitting the command "8'bxxxxxx00" from the external inspection device EQTST to the semiconductor integrated circuit device DEV1, the DEV1 transits to the JTAG accessing state JACCS. As illustrated in FIG. 14, in the JTAG accessing state, in 8 bit information of one field to be transmitted from the EQTST to the DEV1, lower two bits are set to 0 as commands, and two sets of the TCK bits, TMS bits and TDI bits are assigned to the remaining 6 bits. Then, from the EQTST toward the DEV1, data corresponding to 4 fields are transmitted so that data (TDI) of the total 8 bits are transferred to the JTAGIF of the CPU.

In this case, based upon the TCK bits of 8 pieces (Phase 0 to Phase 7) in accordance with these 4 fields, the on-chip debug circuit OCD generates a TCK signal corresponding to 8 cycles, and based upon 8 pieces of the TMS bits and 8 pieces of the TDI bits combined with each other, it also generates a TMS signal corresponding to 8 cycles and a TDI signal corresponding to 8 cycles. Here, in the case of '0' of the TCK bits, a rising edge is generated as the TCK signal, while in the case of '1' of the TCK bits, an 'H' level signal is generated as the TCK signal. Moreover, the OCD successively sends the TCK signal corresponding to 8 cycles, the TMS signal corresponding to 8 cycles and the TDI signal corresponding to 8 cycles toward the JTAGIF of the CPU.

The JTAGIF of the CPU sends a TDO signal corresponding to 8 bits in accordance with this TDI signal corresponding to 8 cycles. In FIG. 2, the on-chip debug circuit OCD collects this TDO signal corresponding to 8 bits, and transmits the resulting data to the serial interface circuit SIF as transmitted parallel data DBGPO. Upon receipt of this, the SIF converts the DBGPO to transmitted serial data DBGO_N by using the parallel-serial conversion circuit PSC, and as shown in FIG. 14, the semiconductor integrated circuit DEV1 sends serial data of one field including the TDO signal of the 8 bits to the external inspection device EQTST. Note that the Phases 0 and 1 of FIG. 14 correspond to the JTAG_0 of FIG. 12, and thereafter, the Phases 6 and 7 of FIG. 14 correspond to the JTAG_3 of FIG. 12, and the transmission from the DEV1 to the EQTST of FIG. 14 corresponds to the JTAG_4 of FIG. 12 in the same manner. Moreover, as indicated by FIG. 12, during an interval between the operations of FIG. 14, a baud rate correction or a baud rate alteration can be carried out on demand.

By continuously keeping this JTAG accessing state, the JTAG access can be carried out efficiently, and as a result, the debug efficiency, etc. can be improved. That is, by a devised assigning process of commands listed in FIG. 3, the semiconductor integrated circuit device DEV1 makes it possible to determine a JTAG accessing command based upon only the lower two bits within one field. For this reason, as illustrated in FIG. 14, by transmitting serial data corresponding to one field from the external inspection device EQTST to the DEV1, information of the JTAG signal (TCK, TMS and TDI) corresponding to 2 cycles can be informed by effectively utilizing the remaining 6 bits. In contrast, in the case when such a devised assigning process of commands is not used, processes are required in which, for example, by using serial data corresponding to one field in a separated manner, the sequence is once allowed to proceed to the JTAG accessing state, and after transferring to this state, information of the JTAG signal needs to be successively informed, with the result that the number of fields increases.

<<Detailed Description of Reset Function>>

Figure 15:
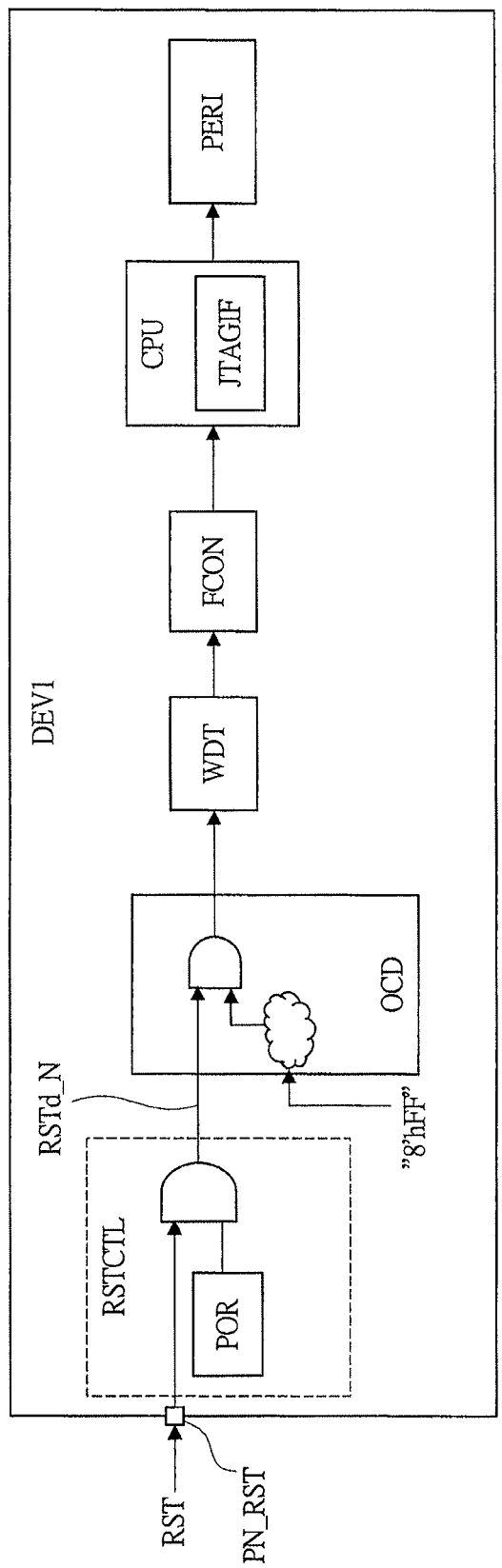

FIG. 15 is a conceptual drawing illustrating one example of a reset function which the on-chip debug circuit of FIG. 2 is provided with. FIG. 15 illustrates a reset path of the entire semiconductor integrated circuit device DEV1 of FIG. 2. FIG. 16 is an explanatory drawing illustrating one example of various kinds of reset sources of FIG. 15 and effective ranges thereof. As illustrated in FIG. 15, in its reset path, the DEV1 is provided with the following circuits in the order from the reset control circuit RSTCTL toward the rear stages: the on-chip debug circuit OCD, a watchdog timer circuit WDT, the flash controller FCON, the processor unit CPU and various peripheral circuits PERI. When a predetermined period of time has elapsed, the WDT forcibly generates a reset signal directed to the rear stages, and in addition, upon receipt of an inputted reset signal, also generates a reset signal directed to the rear stages. Although not particularly limited, the PERI correspond to, for example, the analog circuit block ANLG_BK and the digital circuit block DGTL_BK of FIG. 1.

In the case when the reset signal RST is inputted from the external terminal PN_RST or when the reset signal is generated from the power-on reset circuit POR, the reset control circuit RSTCTL outputs an internal reset signal RSTd_N. In this case, on the premise that a reset signal of negative logic is used, the RSTCTL outputs the RSTd_N by using an AND operation. Upon detection of power application, the POR generates a reset signal. In the case when the RSTd_N is inputted from the RSTCTL or when the command "8'hFF" is inputted from the external inspection device EQTST as illustrated in FIG. 3 etc., the on-chip debug circuit OCD generates a reset signal directed to the rear stages.

For example, in some cases, an attempt is desirably made to reset the entire semiconductor integrated circuit device DEV1 during the debugging process. In such a case, since the JTAG interface normally has a reset function, an operation for carrying out a predetermined access to the JTAGIF inside the CPU from the external inspection device EQTST is proposed. However, in this case, as illustrated in FIG. 16, since the corresponding reset effective range is limited to the CPU as well as the various peripheral circuits PERI on the rear stages thereof, the range does not cover the entire DEV1 including the flash controller FCON, etc. On the other hand, in order to reset the entire DEV1, a process for applying the reset signal RST to the external terminal PN_RST is proposed. In this case, since, for example, such a job as to manually push a reset button or the like connected to the vicinity of the PN_RST is required, the debug efficiency might be lowered particularly when the debugging process is carried out in a state where the DEV1 and the EQTST are far apart from each other in distance.

For this reason, as shown in FIG. 15, a reset function by the use of the command "8'hFF" is prepared in the on-chip debug circuit OCD so that it becomes possible to reset substantially the entire semiconductor integrated circuit device DEV1 including the watchdog timer circuit WDT, the flash controller FCON etc., substantially in the same manner as in the case of the reset signal RST given from the outside. At this time, since it is only necessary to send a command from the external inspection device EQTST toward the DEV1, this system is highly convenient for the user, and improvements in the debugging efficiency and the like can be achieved.

By using the electronic device of the present embodiment as described above, it becomes possible to typically achieve a baud rate adjusting process with high precision. Moreover, since external parts, such as a quartz oscillator or the like, are not particularly required, and since the debugging process is carried out by using only one serial wire, it becomes possible to reduce debug costs. Furthermore, upon carrying out the debugging process, the debugging efficiency can be improved as well as improving the communication efficiency at the time of serial communications. Additionally, an explanation has been given by exemplifying a debugging system; however, of course, the present invention is not intended to be limited by this, and can be applied to general-use serial communication systems (UART) in the same manner. In this case as well, it is also possible to obtain effects, such as realization of a baud rate adjustment with high precision, a cost reduction in serial communication systems, an improvement of communication efficiency in serial communication systems, and the like.

<<Various Modification Examples>>
<Operation of Baud Rate Adjusting Circuit>

In the above descriptions, the baud rate calculation has been carried out by using the average value of the total 9 bits including the start bit (1 bit) STR, and succeeding data bits (8 bits) DAT, as illustrated in FIG. 6 etc.; however, although not particularly limited by this, any average value of a total of 2 bits or more may be used. For example, in the case when an average value of the STR of 1 bit and the succeeding DAT of 7 bits, that is, 8 bits, is used, since its dividing process can be realized by a shift resister or the like, the easiness of the dividing process, the reduction in the area of the dividing circuit, etc. can be achieved in comparison with a case using 9 bits in total. From this point of view, 4 bits in total, 2 bits in total, or the like, may be used. In this case, however, as the number of bits increases, the detection precision of baud rate can be improved; therefore, in particular, it is more preferable to use 9 bits in total or 8 bits in total, when the aforementioned dividing process is taken into account.

<Command Assignment>

Figure 17:
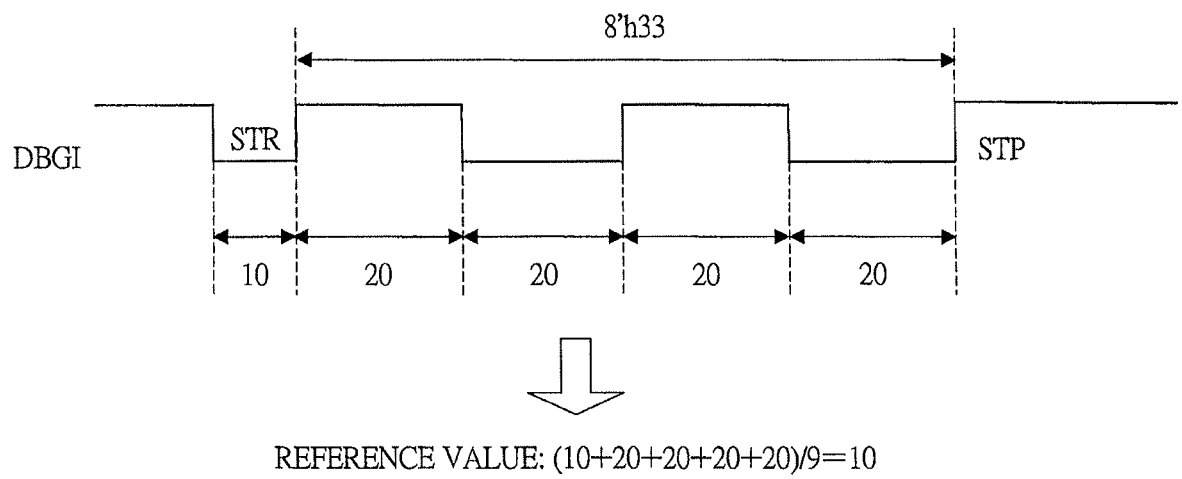
FIG. 17 is an explanatory drawing illustrating a modified example of FIG. 6.

FIG. 17 is an explanatory drawing illustrating a modified example of FIG. 6. As shown in FIG. 17, the baud rate adjusting command is not particularly limited to "8'h55", and a command "8'h33" or another value may be used as shown in FIG. 17. For example, in the case of the command "8'h33" as in the example of FIG. 17, it is only necessary to previously store the fact that the clock cycle number between edges from the start bit STR and thereafter is "2" in the baud rate adjusting circuit BRCTL (for example, the bit counter BITCUNT of FIG. 5). In this case, however, from the viewpoint of providing higher precision by calculating the average value of more bit numbers, it is preferable to use "8'h55".

Moreover, with respect to other command assignments also, although not particularly limited to the values of FIG. 3, those values may be altered to desired values on demand. However, with respect to the JTAG access, it is desirable to assign the commands so as to specify the access based upon one portion of bits in the 8 bits, as described earlier. Moreover, in the present specification, the flash controller FCON and JTAG are exemplified as the modules that are directly accessible through the on-chip debug circuit OCD; however, other modules may be further added thereto. In this case, on the corresponding other modules, command assignments may be carried out in the same manner so that the inner state as indicated by FIG. 12, etc. may be formed.

<Structure of Semiconductor Integrated Circuit Device>

Figure 18:
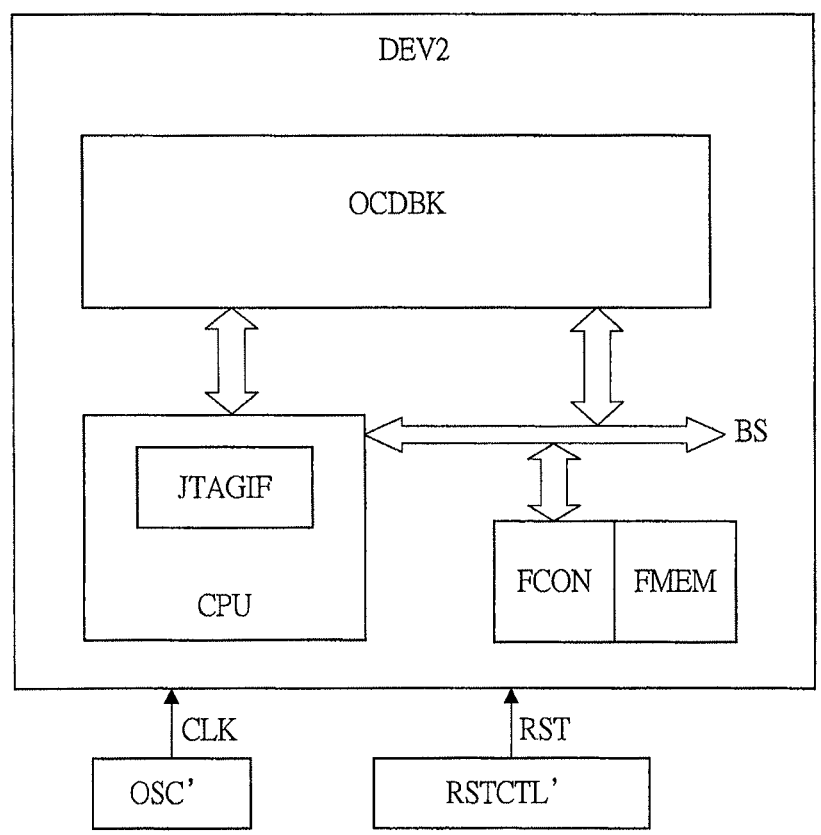
FIG. 18 is a block diagram illustrating a structural example in which the semiconductor integrated circuit device of FIG. 2 is modified.

FIG. 18 is a block diagram illustrating a structural example in which the semiconductor integrated circuit device of FIG. 2 is modified. In comparison with the DEV1 of FIG. 2, a semiconductor integrated circuit device DEV2 shown in FIG. 18 is not provided with an oscillation circuit and a reset control circuit in the DEV2, but provided with an oscillation circuit OSC' and a reset control circuit RSTCTL' on the outside thereof. That is, for example, inside the serial communication system, in the case when a circuit for generating a clock signal CLK, a circuit for generating a reset signal RST and the like are previously installed on the outside of the semiconductor integrated circuit device DEV2, serial communications may be carried out by using the corresponding CLK and RST.

In the foregoing, the invention made by the inventors of the present invention has been concretely described based on the embodiments. However, it is needless to say that the present invention is not limited to the foregoing embodiments and various modifications and alterations can be made within the scope of the present invention.

An electronic apparatus in accordance with the present embodiment is effectively applicable to, in particular, a product including a semiconductor integrated circuit device, such as an MCU (Micro Control Unit), etc. in which an oscillator having low precision is used. Although not particularly limited by these, the electronic apparatus is also widely applicable to general products provided with an asynchronous serial communication function. More specifically, these products include, for example, semiconductor integrated circuit devices in which a JTAG function, a flash memory, and the like are installed, as well as a communication device, etc. in which the semiconductor integrated circuit device is installed.

What is claimed is:

1. An electronic apparatus carrying out serial communication with another apparatus having a communication function, the electronic apparatus comprising:
  a serial interface circuit including a baud rate adjusting circuit and carrying out serial communication with the other apparatus; and
  a clock generation circuit generating an internal clock signal, the electronic apparatus being connected to the other apparatus and receiving a serial signal from the other apparatus,
  wherein the serial signal is composed of a start bit of 1 bit, data bits having a plurality of bits following the start bit and a stop bit of 1 bit following the data bits,
  wherein the baud rate adjusting circuit executes the processes of:
  (a) measuring a time width of each of bits composing the received serial signal by using counting operations of the internal clock signal generated by the clock generation circuit;
  (b) detecting a maximum value and a minimum value of time widths of the respective measured bits;
  (c) computing an average value of the time widths of the respective measured bits;
  (d) computing a maximum tolerance and a minimum tolerance based upon the average value of the time widths of the respective bits;
  (e) determining whether or not the maximum value and the minimum value are located within a range of the maximum tolerance and the minimum tolerance; and
  (f) setting a baud rate corresponding to the average value when the maximum value and the minimum value are within the range of the maximum tolerance and the minimum tolerance, and
  wherein the electronic apparatus executes the serial communication with the other apparatus at the set baud rate.

2. The electronic apparatus according to claim 1, further comprising
  a command identification unit identifying whether or not a value of the data bit within the serial signal received based upon the set baud rate corresponds to a baud rate adjusting command value that has been previously specified,
  wherein the baud rate adjusting circuit has: a first baud rate setting mode executing the (a) to (f) processes upon receipt of the serial signal regardless of an identification result of the command identification unit related to the serial signal; and a second baud rate setting mode for executing the (a) to (e) processes upon receipt of the serial signal and further executing the (f) process when the command identification unit identifies the baud rate adjusting command in the serial signal.

3. The electronic apparatus according to claim 2,
  wherein the baud rate adjusting circuit is designed such that processes are executed upon input of a reset signal in the first baud rate setting mode on one piece of the serial signal received thereafter.

4. The electronic apparatus according to claim 3,
  wherein the command identification unit further identifies whether or not a value of the data bit in the serial signal received based upon the set baud rate corresponds to a value of a baud rate adjusting premise command that has been previously specified, and wherein, when the command identification unit identifies the baud rate adjusting premise command, the baud rate adjusting circuit executes processes in the first baud rate setting mode on one piece of the serial signal received thereafter.

5. The electronic apparatus according to claim 3, wherein the clock generation circuit is a ring oscillator circuit.

6. The electronic apparatus according to claim 3, wherein the maximum tolerance in the (d) process is 1.5 times the average value, and the minimum tolerance in the (d) process is 0.5 times the average value.

7. The electronic apparatus according to claim 3, further comprising:
a JTAG interface circuit operated on the basis of the JTAG (Joint Test Action Group) standard; and
a protocol conversion unit,
wherein the command identification unit further identifies whether or not a value of the data bit within the serial signal received based upon the set baud rate corresponds to a value of a JTAG accessing command previously specified, and
wherein the protocol conversion unit is designed such that, when the command identification unit identifies the JTAG accessing command, the serial signal is converted to a plurality of signals required for the JTAG interface circuit.

8. The electronic apparatus according to claim 7, further comprising:
a nonvolatile memory; and
a memory controller controlling writing/reading operations to and from the nonvolatile memory,
wherein the command identification unit further identifies whether or not a value of the data bit within the serial signal received based upon the set baud rate corresponds to a value of a nonvolatile memory accessing command previously specified,
wherein, when the command identification unit identifies the nonvolatile memory accessing command, the electronic apparatus transmits the serial signal to the memory controller, and
wherein, during a period in which transmissions of the serial signal to the memory controller are carried out by the electronic apparatus a predetermined number of times, the command identification unit temporarily stops identifying processes of respective commands relating to the serial signal.

9. An electronic apparatus connected to an external inspection device through serial communication and provided with such a configuration that enables communication between the external inspection device and an internal circuit installed in the electronic apparatus, the electronic apparatus comprising:
the internal circuit achieving a function as the electronic apparatus;
a clock generation circuit generating an internal clock signal;
a control circuit block realizing serial communication with the internal circuit,
wherein a first operation mode for achieving the function as the electronic apparatus by the use of the internal circuit and a second operation mode for allowing an access to the internal circuit of the electronic apparatus under serial communication by the external inspection device can be set,
wherein the control circuit block includes a communication terminal used in serial communication with the external inspection device, a serial interface circuit that is connected to the communication terminal, and a control circuit that controls communication between the serial interface circuit and the internal circuit of the electronic apparatus, the control circuit block being connected to the external inspection device and receiving a serial signal from the external inspection device in the second operation mode,
wherein the serial signal is composed of a start bit of 1 bit, data bits having a plurality of bits following the start bit and a stop bit of 1 bit following the data bits,
wherein the serial interface circuit includes:
a serial-parallel conversion circuit that converts the serial signal received by the communication terminal to a parallel signal;
a parallel-serial conversion circuit that converts a parallel signal received from the internal circuit to a serial signal and transmits a resulting signal to the communication terminal; and
a baud rate adjusting circuit that sets an operation timing of the serial-parallel conversion circuit and the parallel-serial conversion circuit,
wherein the baud rate adjusting circuit executes the processes of:
(a) measuring a time width of each of bits forming the received serial signal by using counting operations of the internal clock signal generated by the clock generation circuit, which is carried out on the serial signal received through the communication terminal, with the baud rate adjusting circuit being set in the second operation mode;
(b) detecting a maximum value and a minimum value of time widths of the respective measured bits;
(c) computing an average value of the time widths of the respective measured bits;
(d) computing a maximum tolerance and a minimum tolerance based upon the average value of the time widths of the respective bits;
(e) determining whether or not the maximum value and the minimum value are within a range of the maximum tolerance and the minimum tolerance; and
(f) setting a baud rate corresponding to the average value when the maximum value and the minimum value are within the range of the maximum tolerance and the minimum tolerance, and
wherein the control circuit block carries out serial communication with the external inspection device through the communication terminal at the set baud rate.

10. The electronic apparatus according to claim 9, wherein the control circuit includes a command identification unit for identifying whether or not a value of the data bit within the serial signal received based upon the set baud rate corresponds to a baud rate adjusting command value that has been previously specified, and
wherein the baud rate adjusting circuit has: a first baud rate setting mode in which the (a) to (f) processes are executed regardless of the identification result of the command identification unit relating to the serial signal upon receipt of the serial signal; and a second baud rate setting mode in which the (a) to (e) processes are executed upon receipt of the serial signal and the (f) process is executed when the command identification unit identifies the baud rate adjusting command in the serial signal.

11. The electronic apparatus according to claim 10, wherein the baud rate adjusting circuit is designed such that, upon input of a reset signal, processes are executed in the first baud rate setting mode on one piece of the serial signal received thereafter.

12. The electronic apparatus according to claim 11, wherein the command identification unit further identifies whether or not a value of the data bit in the serial signal received based upon the set baud rate corresponds to a value of a baud rate setting premise command that has been previously specified, and wherein, when the command identification unit identifies the baud rate adjusting premise command, the baud rate adjusting circuit executes processes in the first baud rate setting mode on one piece of the serial signal received thereafter.

13. The electronic apparatus according to claim 11, wherein the clock generation circuit is a ring oscillator circuit.

14. The electronic apparatus according to claim 11,
wherein the maximum tolerance in the (d) process is 1.5 times the average value, and
the minimum tolerance in the (d) process is 0.5 times the average value.

15. The electronic apparatus according to claim 11,
wherein the internal circuit includes a processor circuit including a JTAG interface circuit operated on the basis of the JTAG (Joint Test Action Group) standard,
wherein the control circuit further includes a protocol conversion unit,
wherein the command identification unit further identifies whether or not a value of the data bit within the serial signal received based upon the set baud rate corresponds to a value of a JTAG accessing command previously specified, and wherein the protocol conversion unit is designed such that, when the command identification unit identifies the JTAG accessing command, the serial signal is converted to a plurality of signals required for the JTAG interface circuit.

16. The electronic apparatus according to claim 15,
wherein the internal circuit further includes:
a nonvolatile memory; and
a memory controller that controls writing/reading operations to and from the nonvolatile memory,
wherein the command identification unit further identifies whether or not a value of the data bit within the serial signal received based upon the set baud rate corresponds to a value of a nonvolatile memory accessing command previously specified,
wherein, when the command identification unit identifies the nonvolatile memory accessing command, the control circuit transmits the serial signal to the memory controller, and
wherein, during a period in which transmissions of the serial signal to the memory controller are carried out by the electronic apparatus a predetermined number of times, the command identification unit temporarily stops identifying processes of respective commands relating to the serial signal.

* * * * *